(12) United States Patent
Hachimura et al.

(10) Patent No.: US 7,139,585 B2
(45) Date of Patent: Nov. 21, 2006

(54) WIRELESS COMMUNICATION APPARATUS AND SYSTEM

(75) Inventors: Futoshi Hachimura, Yokohama (JP); Hiroyuki Yatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 09/843,806

(22) Filed: Apr. 30, 2001

(65) Prior Publication Data

US 2001/0018350 A1    Aug. 30, 2001

Related U.S. Application Data

(62) Division of application No. 08/622,583, filed on Mar. 28, 1996.

(30) Foreign Application Priority Data

Mar. 31, 1995 (JP) .................................. 7-075777
Sep. 29, 1995 (JP) .................................. 7-252844

(51) Int. Cl.
    *H04Q 7/20* (2006.01)
(52) U.S. Cl. ........................ 455/462; 455/463; 455/464; 455/465; 455/555; 455/554.1; 379/321.08; 379/221.13; 379/233
(58) Field of Classification Search ................ 455/414, 455/416, 417, 422.1, 426.2, 74.1, 461–463, 455/465, 555, 567, 554.1; 379/221.08, 221.13, 379/225, 231, 233
See application file for complete search history.

(56) References Cited

U.S. PATENT DOCUMENTS

| | | | |
|---|---|---|---|
| 4,682,367 A | 7/1987 | Childress et al. | 455/416 |
| 4,955,082 A * | 9/1990 | Hattori et al. | 455/440 |
| 4,989,231 A | 1/1991 | Ishikawa | 379/59 |
| 5,159,702 A | 10/1992 | Aratake | 455/464 |
| 5,206,901 A * | 4/1993 | Harlow et al. | 379/211.04 |
| 5,255,308 A | 10/1993 | Hashimoto et al. | 379/61 |
| 5,369,694 A * | 11/1994 | Bales et al. | 379/206.01 |
| 5,375,163 A | 12/1994 | Kamimoto et al. | 455/464 |
| 5,390,233 A * | 2/1995 | Jensen et al. | 455/417 |
| 5,454,032 A * | 9/1995 | Pinard et al. | 379/167.05 |
| 5,483,588 A * | 1/1996 | Eaton et al. | 379/202.01 |
| 5,502,762 A * | 3/1996 | Andrew et al. | 379/202.01 |
| 5,517,551 A | 5/1996 | Arai | 455/566 |
| 5,559,860 A | 9/1996 | Mizikovsky | 379/58 |
| 5,574,774 A | 11/1996 | Ahlberg et al. | 379/59 |
| 5,768,356 A * | 6/1998 | McKendry et al. | 379/242 |
| 5,771,457 A | 6/1998 | Tsutsui | 455/463 |
| 6,243,583 B1 | 6/2001 | Tsutsui et al. | 455/442 |

FOREIGN PATENT DOCUMENTS

| | | | |
|---|---|---|---|
| CA | WO9429992 | * | 12/1994 |
| EP | 549126 A2 | * | 6/1993 |
| JP | 63261947 | * | 10/1988 |

* cited by examiner

*Primary Examiner*—Nay Maung
*Assistant Examiner*—Sujatha Sharma
(74) *Attorney, Agent, or Firm*—Fitzpatrick, Cella, Harper & Scinto

(57) ABSTRACT

When an incoming call to a wireless communication apparatus is detected, a wireless control apparatus uses a wireless link, which has been established by previous communication, to perform succeeding communication. Examples of communication include communication of audio or data already completed, or, when there are a plurality of wireless communication apparatus, communication of control information by a wireless link established when notification of an incoming call is given to the wireless communication apparatus.

13 Claims, 22 Drawing Sheets

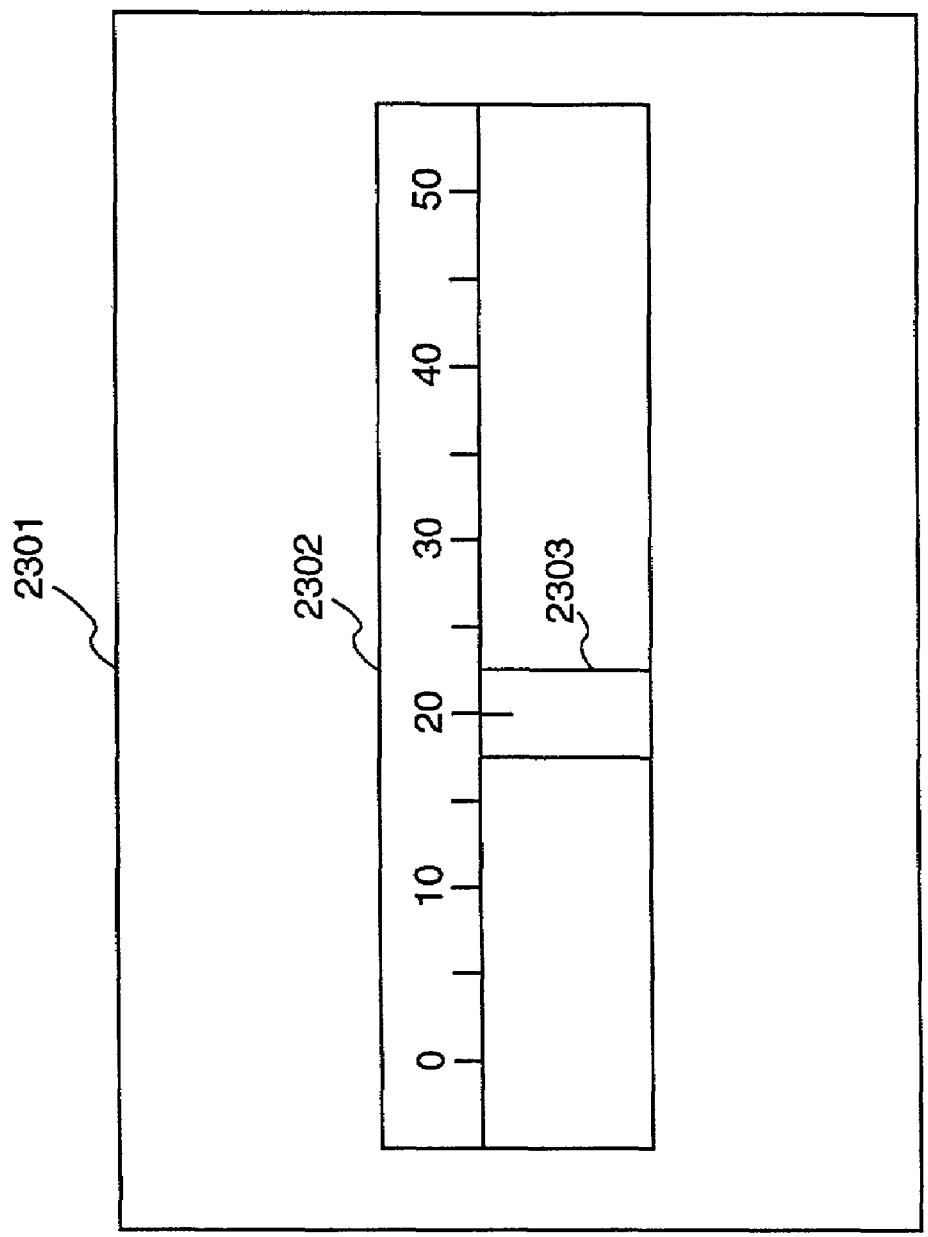

WIRELESS COMMUNICATION APPARATUS AND SYSTEM

This application is a division of application Ser. No. 08/622,583, filed on Mar. 28, 1996.

BACKGROUND OF THE INVENTION

1. Field of the Invention

This invention relates to a wireless control apparatus wirelessly connected to a wireless communication apparatus, as well as to a system comprising the wireless communication apparatus and the wireless control apparatus.

2. Description of the Related Art

A wireless communication system known in the art comprises a wireless control apparatus (master) and a wireless communication apparatus (slave) wirelessly connected to the wireless control apparatus.

When a transmission request is issued from the slave side or an incoming call is terminated at the slave side in a wireless communication system of this kind, the master searches for and decides upon the communication channel used in this communication between the master and slave and so notifies the slave using a control channel, whereupon the slave is shifted to the communication channel of which it has been notified, thereby establishing a wireless link.

When communication ends, control for the purpose of cutting off the wireless link is carried out over a prescribed period of time, whereupon the wireless link is cut.

However, when an incoming call to the slave is detected after communication ends, the wireless link is cut temporarily. This is despite the fact that the wireless link has hot been cut through the link cutting control operation because this operation is still in progress. This means that a new control channel is temporarily occupied to search for and decide upon an idle communication channel and establish a wireless link anew, whereupon communication commences. This procedure takes time. Moreover, if the wireless link cannot be established the second time, it may not be possible to perform communication in response to the incoming call.

Further, in order to make all slaves ring at the time of an incoming call from a communication line in a situation where a plurality of slaves exist, wireless links are established to all of the slaves. If an outgoing call is then abandoned by disconnection on the calling side, the wireless links to the slaves are cut. Or, if a slave responds to the incoming call, the wireless links to slaves other than the responding slave are disconnected.

Accordingly, if a party not sought by the calling side answers the incoming call, it is required that the call be transferred. When the transfer is made, the slave that is the destination of the transfer must re-establish the wireless link and the calling party is made to wait until this is achieved.

In particular, when there is an incoming call from another outside line or an outgoing call to a communication apparatus of another extension in the case of communication apparatus or private branch exchange accommodating a plurality of communication lines (outside lines) and also having a number of extensions, there are instances where a procedure for establishing a wireless link with the other communication apparatus is made to wait while a procedure for establishing a wireless link is being executed for the incoming call or outgoing call. It may take several seconds or more before the communication apparatus that is the destination of the transfer answers or before there is a hold response made by the other communication apparatus. The result is poor operability.

SUMMARY OF THE INVENTION

Accordingly, an object of the present invention is to eliminate the troublesome task of re-establishing a wireless link and use an already established wireless link as is in a case where an incoming call arrives at a wireless communication terminal after the end of communication, thereby making it possible to start communication rapidly without occupying a control channel for a fixed period of time for the purpose of establishing the wireless link.

Another object of the present invention is to maintain a wireless link for a period of time longer than that required to disconnect the wireless link after communication ends.

A further object of the present invention is to provide a wireless communication system in which, in an instance where a calling party receives a response from a party different from the intended party after the incoming call from a public telephone line is terminated and answered, as is often the case where a hold-and-transfer operation is used most frequently, the operation for effecting transfer to another communication terminal or for holding and answering at another communication terminal is facilitated.

Still another object of the present invention is to make it possible to adjust the time needed to disconnect a wireless link after communication ends.

Still another object of the present invention is to make it possible to adjust the time needed to disconnect the wireless link of a communication terminal other than a communication terminal that has responded to an incoming call, the purpose being to achieve a speedy transfer to the other communication terminal after an incoming call from a telephone line to a plurality of wireless communication terminals is terminated and answered or to achieve a prompt holding response at the other communication terminal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 23 is a block diagram showing the construction of a control panel according to the seventh embodiment of the invention.

DESCRIPTION OF THE PREFERRED EMBODIMENTS

Preferred embodiments of the present invention will now be described in detail with reference to the drawings.

Figure 1:
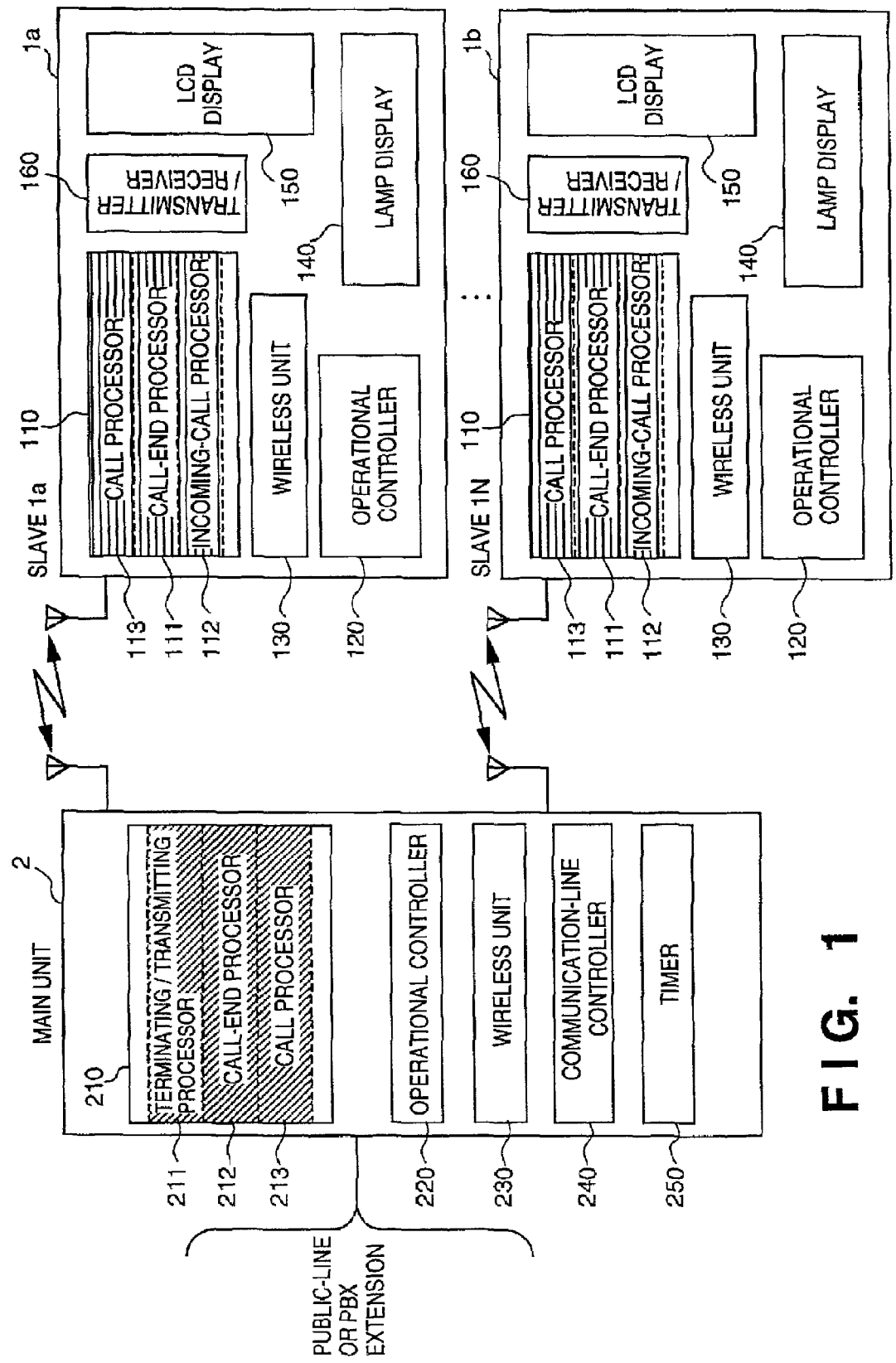
FIG. 1 is a block diagram illustrating the construction of a wireless telephone system according to a first embodiment of the present invention.

FIG. 1 is a block diagram showing a wireless telephone system according to a first embodiment of the present invention.

This system comprises a cordless slave (referred to as a "slave" below) 1, i.e., a wireless slave, and a key telephone master (referred to as a "main unit" below) 2.

The slave 1 has a memory 110 for processing and stores a call end-processor 111, an incoming-call processor 112 and a call processor 113, an operational controller 120 for supervising control of the slave, a wireless unit 130 for supervising wireless connection and disconnection between the slave and the main unit 2, a lamp display 140 which flashes a main-wire lamp for an incoming call to an outside line; an LCD display 150 for displaying the telephone number of an incoming call to an outside line, and a transmitter/receiver 160 for transmitting and receiving (talking and listening).

The main unit 2 has a memory 210 which stores a terminating/transmitting processor 211, a call-end processor 212 and a call processor 213, an operational controller 220 for supervising control of the main unit, a wireless unit 230 for supervising wireless connection and disconnection between the main unit 2 and a slave, a communication-line controller 240 for managing or controlling a main wire such as a public telephone line, and a wireless-link disconnect timer 250. The timer 250 may be implemented by executing program processing within the operational controller 220.

Figure 2:
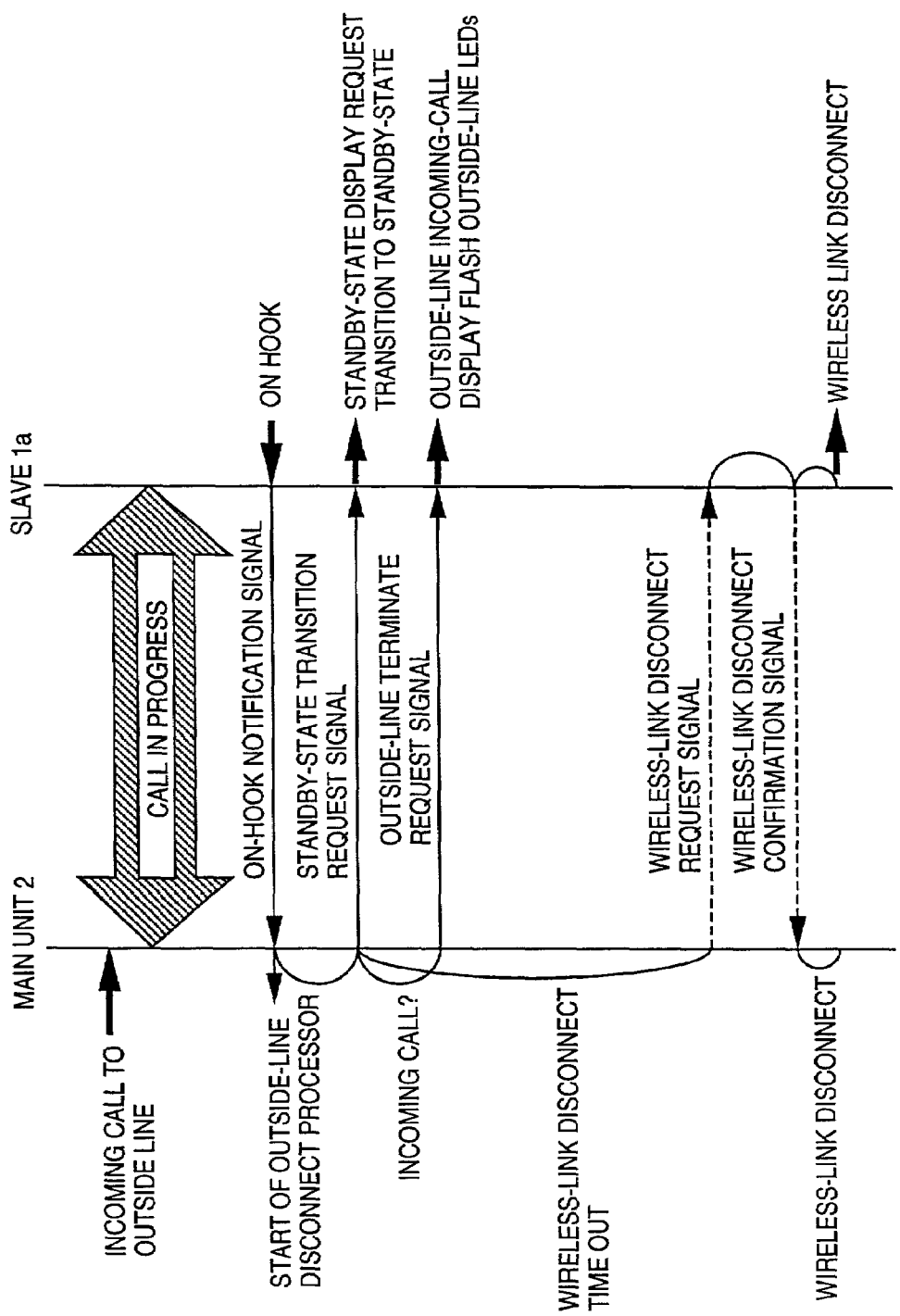
FIG. 2 is a sequence chart showing an example of operation of the wireless telephone system according to the first embodiment.
Figure 3:
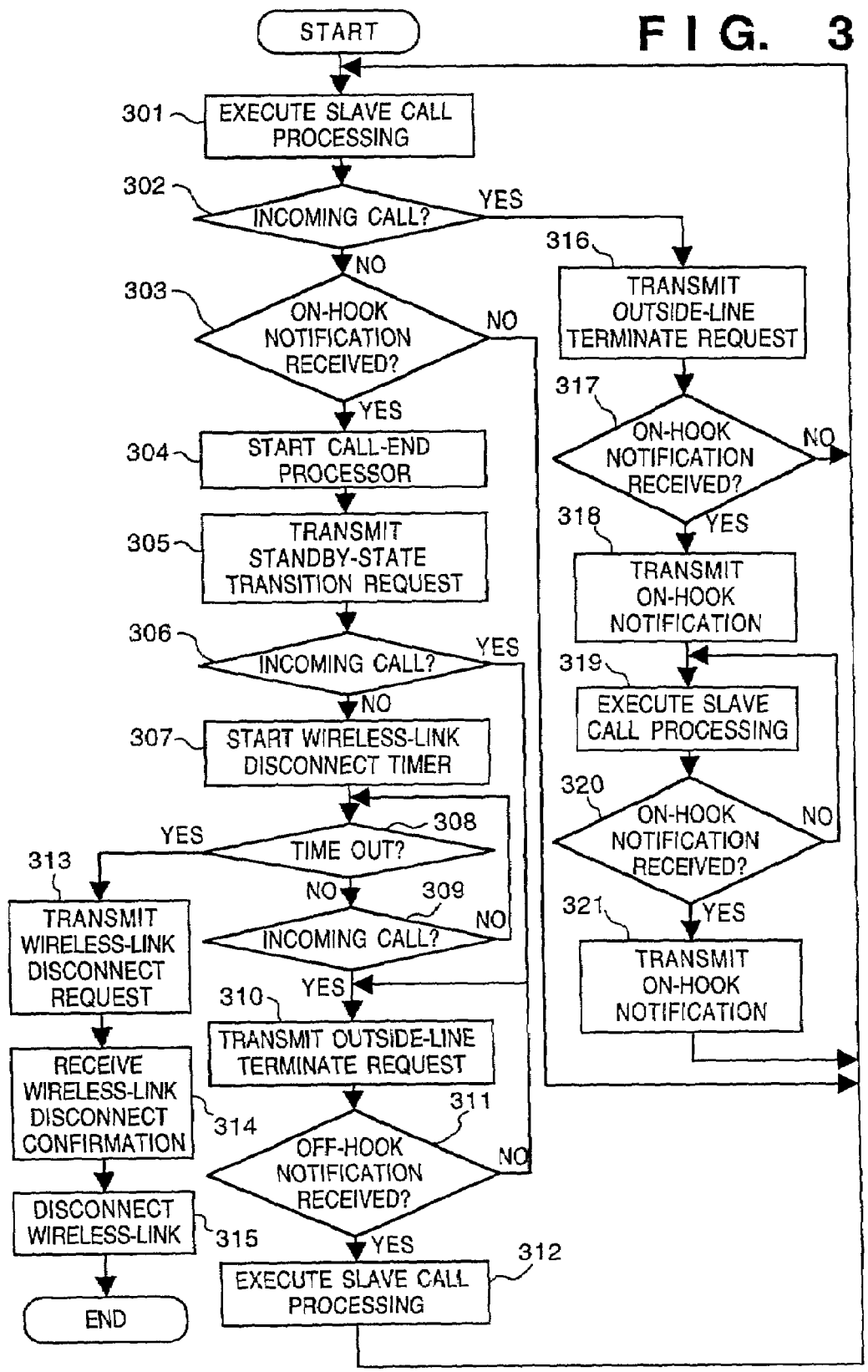
FIG. 3 is a flowchart showing an example of the operation of a main unit according to the first embodiment.

FIG. 2 is a sequence chart showing an example of operation of the wireless telephone system according to the first embodiment, and FIG. 3 is a flowchart showing an example of the operation of the main unit 2 according to the first embodiment.

As shown at step 301 in FIG. 3, the operational controller 220 starts up the call processor 213 within the memory 210 to execute call processing. If, during this processing, notification that slave 1a is on the hook is received via the wireless unit 230 at step 303 without detection of an incoming call to the slave 1a at step 302, the operational controller 220 starts up the call-end processor 212 in memory 210 at step 304 and transmits a standby-state transition request, which is for placing the master on standby while maintaining the established wireless link, to the slave 1 at step 305 via the wireless unit 230 under the command of the operational controller 220. At this time the main unit 2 determines at step 306 whether or not there is an incoming call to the slave 1a. If there is no incoming call, the wireless-link disconnect timer 250, which is for disconnecting the wireless link upon elapse of a prescribed period of time, is started at step 307 in response to a command from the operational controller 220. If there is an incoming call ("YES" at step 309) to the slave 1a before the timer runs out of time ("NO" at step 308), the operational controller 220 resets the wireless-link disconnect timer 250, starts the terminating/transmitting processor 211 in the memory 210 and, in order to notify the slave 1a of the incoming call, sends an outside-line terminate request to the slave 1a at step 310 using the wireless link already established by the preceding call via the wireless unit 230. Then, if notification of the fact that the slave 1a has been taken off the hook is received from the slave 1a at step 311 by the wireless link that was being used by the preceding call, the operational controller 220 starts the call processor 213 in the memory 210 and executes processing (step 312) for calling the slave 1a using the wireless link already established by the preceding call via the wireless unit 230.

If an incoming call to the slave 1a is detected at step 306 when notification of the end of the call has been received from the slave 1a, the operational controller 220 starts the terminating/transmitting processor 211 in the memory 210 and sends the outside-line terminate request to the slave 1a via the wireless unit 230 at step 310 using the wireless link already established by the preceding call. Thereafter, if notification of the fact that the slave 1a is off the hook is received from the slave 1a at step 311, the operational controller 220 starts the call processor 213 in the memory 210 to execute call processing (step 312) with respect to the slave 1a.

If the fact that the timer 250 has run out of time is detected by the operational controller 220 at step 308, then, in order to disconnect the wireless link, the operational controller 220 sends a wireless-link disconnect request to the slave 1a via the wireless link 230 at step 313 and disconnects the wireless link at step 315 when confirmation of wireless-line disconnection from the slave 1a is received via the wireless unit 230 at step 314.

If an incoming call is detected (as by a telephone beeper service) at step 302 during communication, the operational controller 220 sends the slave 1a, via the wireless unit 230, the outside-line terminate request to inform the slave 1a of the incoming call (step 316). If notification that slave 1a is off the hook is received from the slave 1a (step 317), then the operational controller 220 sends notification of this fact to the exchange via the public telephone line (step 318). The exchange places the call on hold and transmits a call signal with regard to the terminating call. As a result, the operational controller 220 executes call processing (step 319) with respect to the slave 1a using the established wireless link as is. When notification of the fact that the slave 1a is on the hook is received again (step 320), the operational controller 220 communicates this fact to the exchange (step 321) so that the call that was in the held state is started again.

Figure 4:
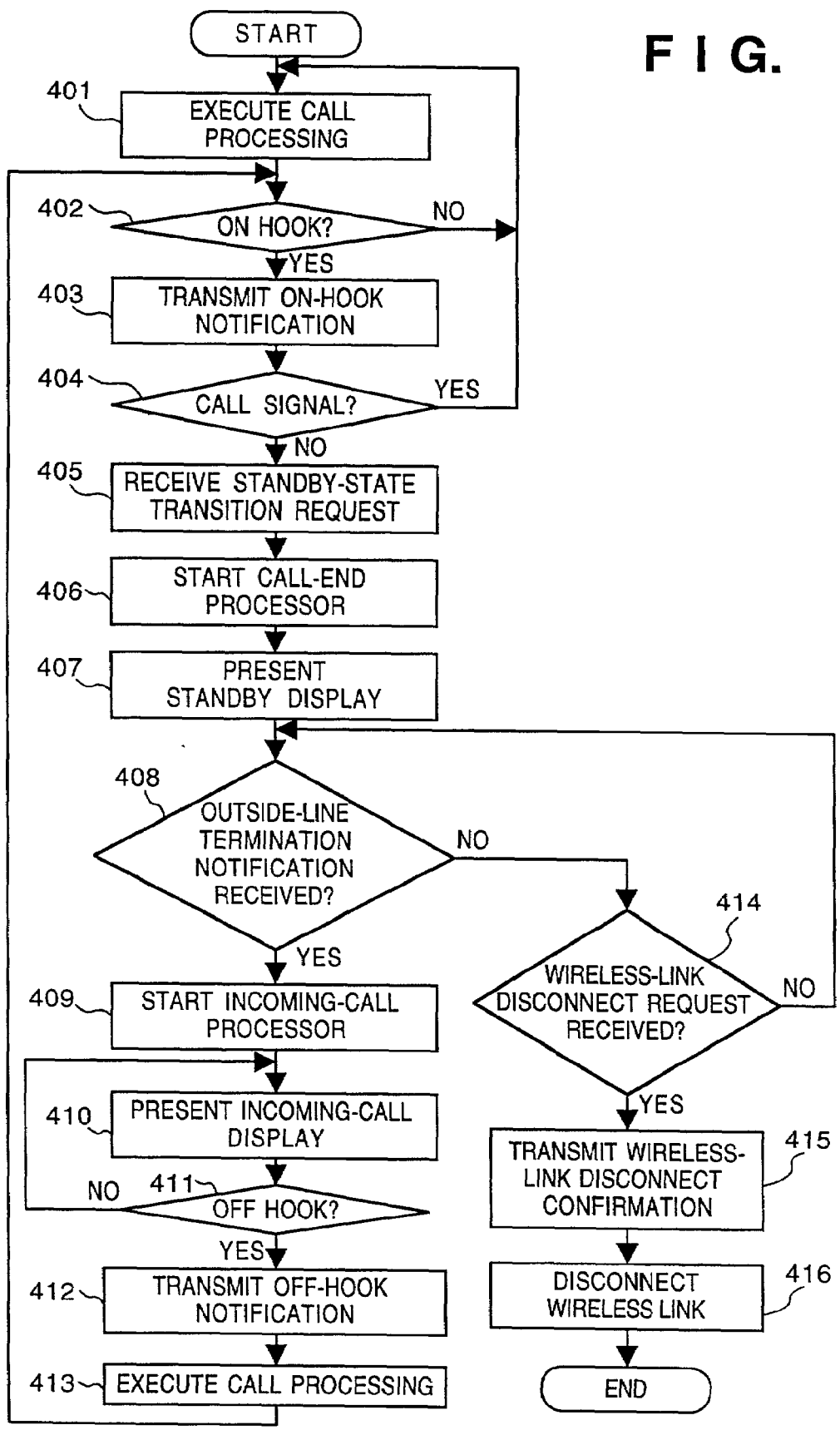
FIG. 4 is a flowchart showing an example of the operation of a slave according to the first embodiment.

FIG. 4 is a flowchart showing operation of the slave 1a according to this embodiment.

In FIG. 4, the operational controller 120 starts the call processor 113 in memory 110 and executes call processing at step 401 using the transmitter/receiver 160 and wireless unit 130. If the handset of the transmitter/receiver 160 is on the hook ("YES" at step 402), the operational controller 120 so notifies the main unit 2 (step 403) via the wireless unit 130. If beeper service is being received, the call processing in response to the incoming call is continued (step 404) using the established wireless link. If beeper service is not being received, however, the operational controller 120 of the slave 1a that has received a standby-state transition request (step 405) from the main unit 2 via the wireless unit 130 starts the call-end processor 111 in memory 110 at step 406 and causes the LDC display unit 150 to present a display indicative of the standby state at step 407. The operational controller 120 then undergoes a transition to the standby state.

The wireless link that was being used in the preceding call is kept as is until the wireless-link disconnect request is received from the main unit 2.

Upon receiving notification of outside line termination from the main unit 2 via the wireless unit 130 at step 408, the operational controller 120 starts the incoming-call processor 112 in memory 110 at step 409 and causes the LDC display unit 150 and lamp display unit 140 to display the fact that the incoming line has arrived at the outside line (step 410).

When the operator observes the LDC display unit 150 and lamp display unit 140 and takes the phone off the hook at step 411, the operational controller 120 transmits notification of this fact to the main unit 2 (step 412) using the wireless link that was being used in the preceding call and then starts the call processor 113 in memory 110 to execute call processing with regard to the above-mentioned outside line (step 413).

If notification of the incoming call to the outside line is not received from the main unit 2 at step 408 the wireless-link disconnect request is received from the wireless unit 130 at step 414, the operational controller 120 transmits a wireless-link disconnect confirmation signal to the main unit 2 via the wireless unit 130 at step 415 to disconnect the wireless link at step 416.

Figure 5:
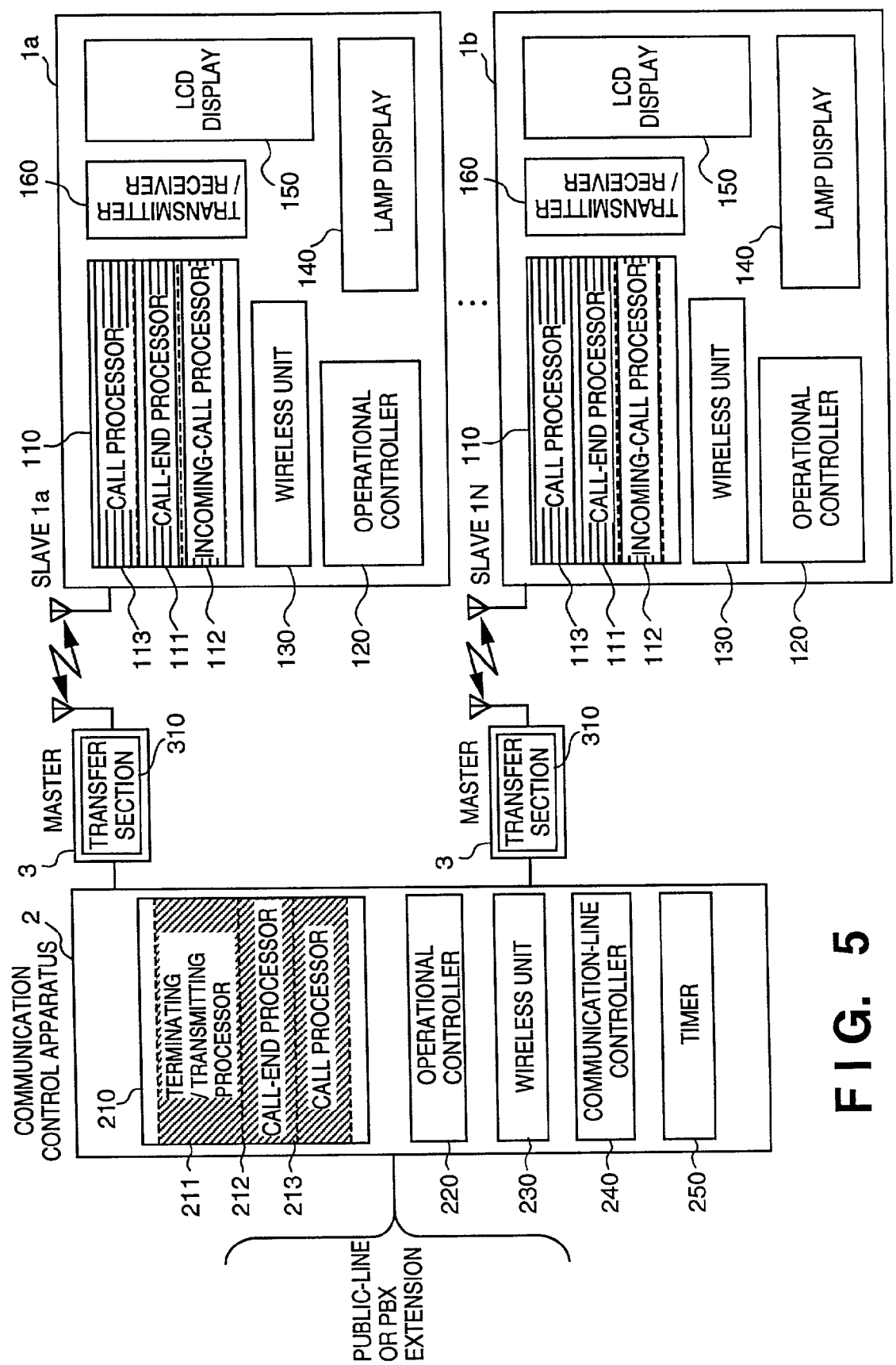
FIG. 5 is a block diagram illustrating the construction of a wireless telephone system according to a second embodiment of the present invention.

FIG. 5 is a block diagram based upon a wireless system according to a second embodiment of the invention.

The system of FIG. 5 differs from that of FIG. 1 in that a cordless master (referred to as a "master" below) 3 serving as a wireless master is connected to the main unit 2 by a wire line 2, with the master 3 being provided internally with a transfer section 310 for transfer of wireless communication between the main unit 2 and the slave 1. Other components are similar to those of the first embodiment (FIG. 1) and need not be described again.

Figure 6:
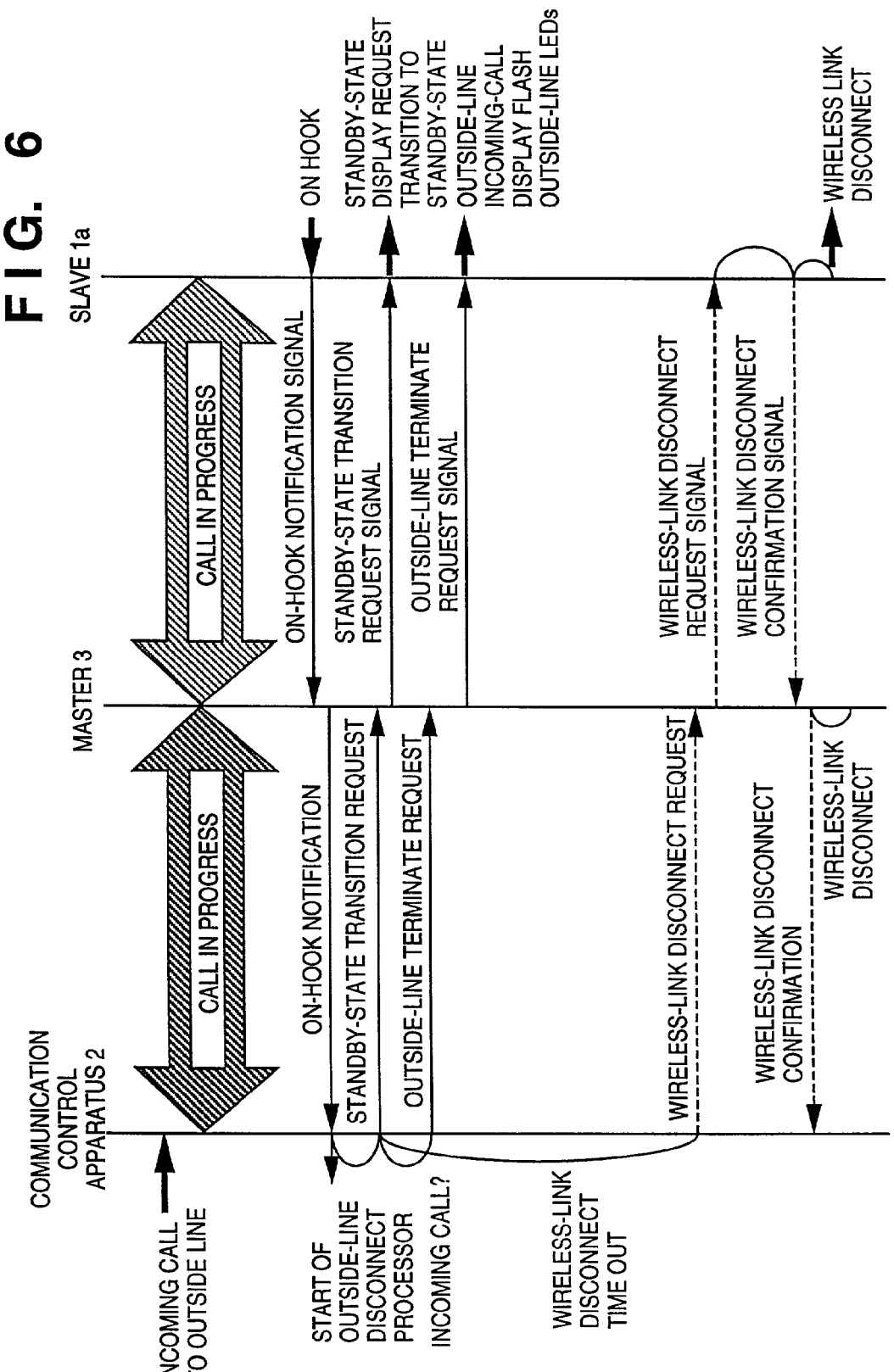
FIG. 6 is a sequence chart showing an example of operation of the wireless telephone system according to the second embodiment.

FIG. 6 is a sequence chart showing an example of operation of the wireless telephone system according to this embodiment.

The master 3 relays wireless communication between the main unit 2 and slave 1 by using the transfer section 310, thereby effecting a transfer operation. The operation of the main unit 2 and each of slaves 1a~1N is the same as in the first embodiment and need not be described again.

If the cord length between the main unit 2 and master 3 is extended by adopting an arrangement of the kind shown in FIG. 5, the slaves 1 can be deployed over a wider area.

Figure 7:
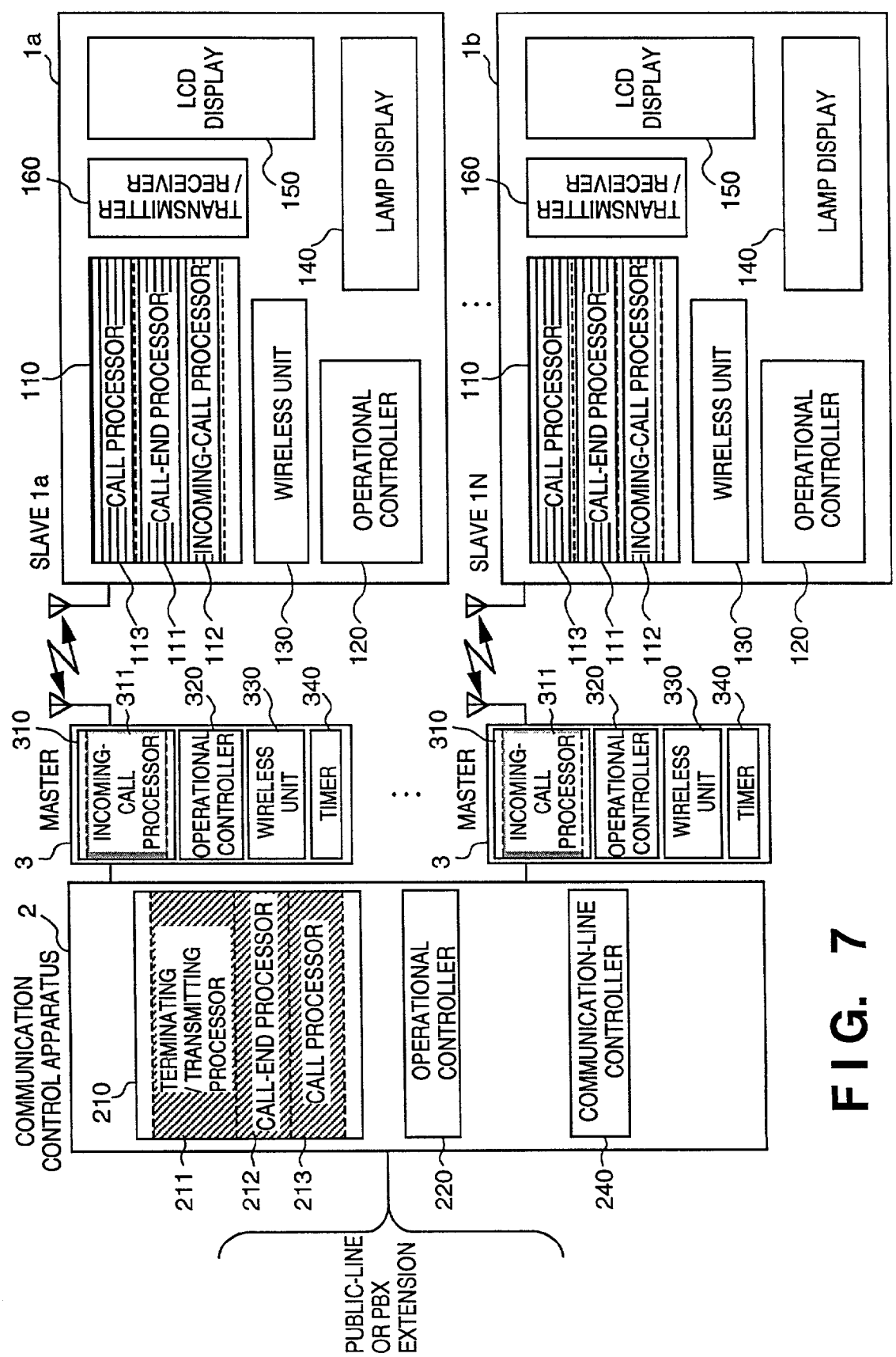
FIG. 7 is a block diagram illustrating the construction of a wireless telephone system according to a third embodiment of the present invention.

FIG. 7 is a block diagram illustrating a third embodiment of the present invention.

In this embodiment, as shown in FIG. 7, the wireless unit in the main unit 2 is eliminated, and the master 3 is provided with a memory 310 storing a terminating/transmitting processor 311, an operational controller 320 for supervising control of the master 3, a wireless unit 300 for performing wireless connection and disconnection between the master 3 and a slaves 1, and a timer 340. Other components are similar to those of the second embodiment shown in FIG. 5.

Thus, the third embodiment is characterized by the fact that the sections for processing relating to connection of the wireless link are provided in the master 3 to execute this processing.

Figure 8:
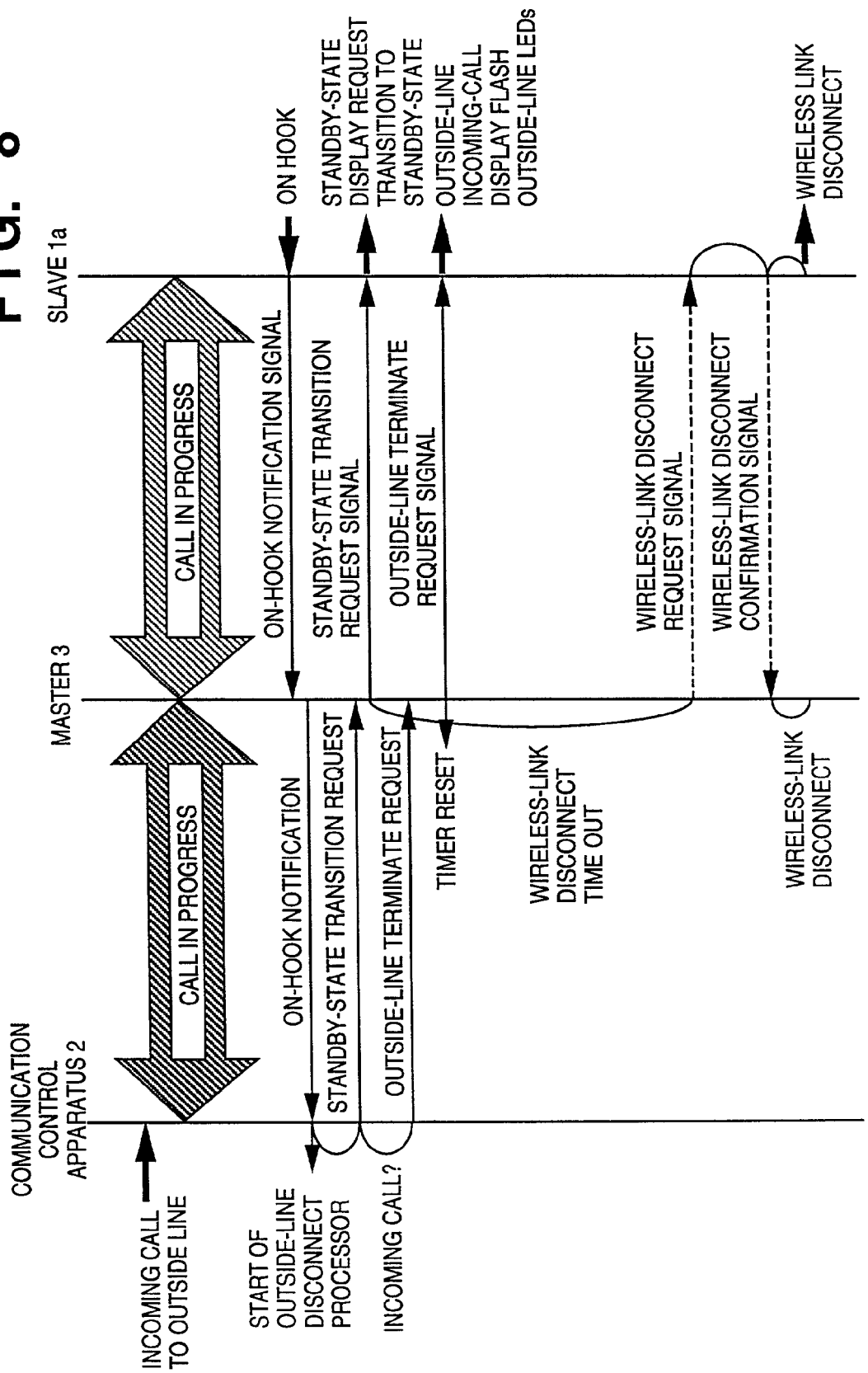
FIG. 8 is a sequence chart showing an example of operation of the wireless telephone system according to the third embodiment.

FIG. 8 is a sequence chart showing an example of operation of the wireless system according to the embodiment of the invention.

Figure 9:
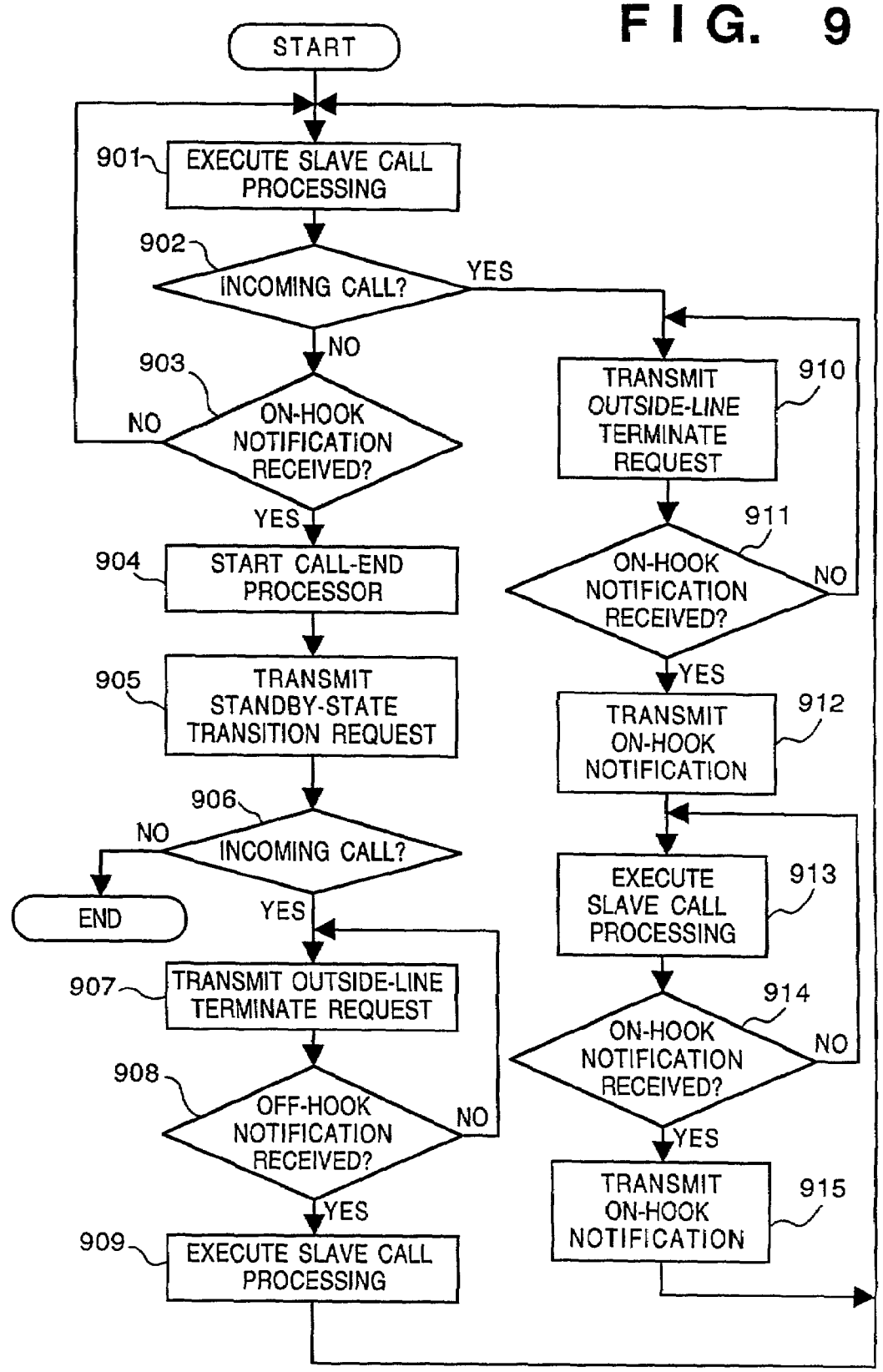
FIG. 9 is a flowchart showing an example of the operation of a communication control apparatus according to the third embodiment.

FIG. 9 is a flowchart showing an example of the operation of the communication control apparatus 2 according to this embodiment.

As shown at step 901 in FIG. 9, the operational controller 220 executes call processing with respect to the slaves 1. If, during this processing, notification that slave 1a is on the hook is received via the master 3 at step 903 without detection of an incoming call to the slave 1a at step 902, the operational controller 220 starts up the call-end processor 212 in memory 210 at step 904 and transmits a standby-state transition request to the master 3 at step 905.

If there is an incoming call to the slave 1a at step 906, the operational controller 220 starts the terminating/transmitting processor 211 in the memory 210 and transmits an outside-line terminate request to the master 3 at step 907. Then, if notification of the fact that the slave 1a has been taken off the hook is received from the master 3 at step 908, the operational controller 220 starts the call processor 213 in the memory 210 and executes processing (step 909) for calling the slave 1a.

If an incoming call to the slave 1a is detected at step 902, the operational controller 220 sends the outside-line terminate request to the master 3 at step 910. If notification of the fact that the slave 1a is on the hook is received from the slave 1a at step 911, the operational controller 220 notifies the exchange of this fact via the public telephone line at step 912 and executes call processing with respect to the incoming call at step 913.

When notification of the fact that the slave is on the hook is received again (step 914), the operational controller 220 communicates this fact to the exchange (step 915) and executes call processing for calling the slave 1a.

Figure 10:
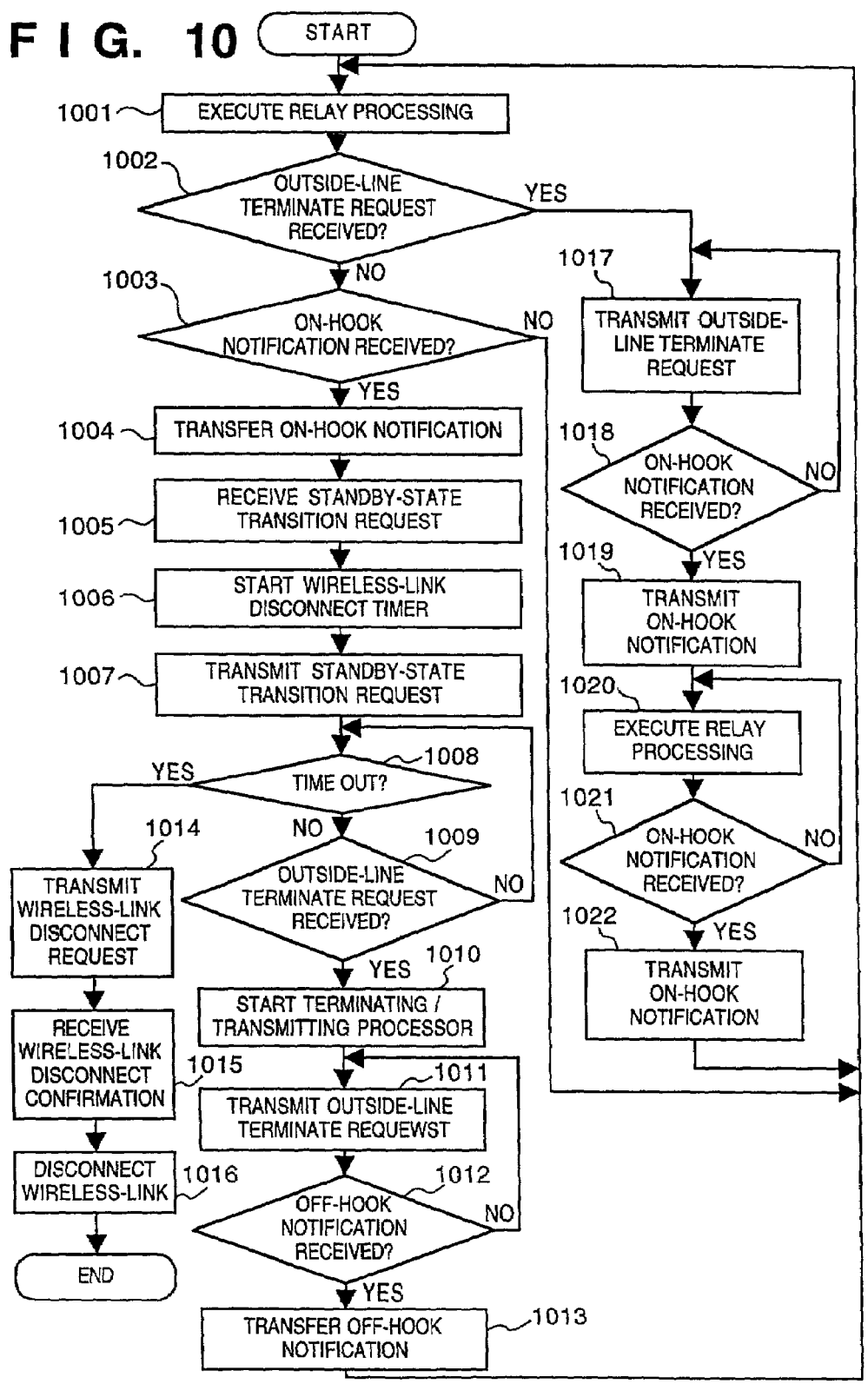
FIG. 10 is a flowchart showing an example of the operation of a master according to the third embodiment.

FIG. 10 is a flowchart showing an example of operation of the master 3 according to this embodiment.

Processing (step 1001) for relaying communication between the slave 1a and communication control apparatus 2 is performed by the wireless unit 330 in response to a command from the operational controller 320. If notification of the fact that the slave 1a is on the hook is received from the slave 1a ("YES" at step 1003) without the outside-line terminate request being sent from the communication control apparatus ("NO" at step 1002), notification of the fact that the slave 1a is on the hook is transferred to the communication control apparatus 2 (step 1004). If the standby-state transition request is subsequently received from the communication control apparatus at step 1005, the operational controller 320 starts the wireless-link disconnect timer 340 at step 1006 and transmits the standby-state transition request to the slave 1a via the wireless unit 330 at step 1007. If the outside-line terminate request is received from the communication control apparatus 2 at step 1009 before the timer 340 runs out of time ("NO" at step 1008), the operational controller 320 starts the terminating/transmitting processor 311 in memory 310 at step 1010 and transmits the outside-line terminate request to the slave 1a at step 1011 using the wireless link that was being used in the preceding call.

If notification that the slave 1a is off the hook is subsequently received from the slave via the wireless unit 330 ("YES" at step 1012), the operational controller 320 transfers notification of this event to the communication control apparatus 2 (step 1013) and executes processing (step 1001) for the relay operation between the slave 1a and the communication control apparatus 2.

If the timer runs out of time ("YES" at step 1008) before the outside-line terminate request is received, the operational controller 320 transmits the wireless-link disconnect request to the slave 1a (step 1014) via the wireless unit 330 by the wireless link that was being used in the preceding call. If confirmation of disconnection of the wireless link is received from the slave 1a via the wireless unit 330 by the wireless link that was being used in the preceding call (step 1015), the operational controller 320 disconnects the wireless link at step 1016.

If the outside-line terminate request is sent from the communication control apparatus during relay processing ("YES" at step 1002), the request is transmitted to the slave 1a (step 1017). If notification that the slave 1a is on the hook is received from the slave ("YES" at step 1018), notification of this fact is transmitted to the communication control apparatus at step 1019. When transfer of this notification is finished, processing (step 1020) for relaying the communication between the communication apparatus and the slave 1a is performed using the established wireless link.

When notification that the slave 1a is on the hook is received ("YES" at step 1021), notification of this fact is transmitted to the communication control apparatus at step 1022 and relay processing is executed again.

The operation of the slave 1a is similar to that of the first embodiment and need not be described again.

By adopting this embodiment, the processing relating to the wireless link is executed almost entirely within the master 3. As a result, the communication control apparatus 2 can transmit commands without taking the status of the wireless link into account, and it will suffice to provide the same program irrespective of processing of a wired telephone. A particular advantage of this invention is that it is possible to create the program of the communication control apparatus 2 without being aware of the fact that the telephone is a wireless telephone.

The first, second and third embodiments are described in conjunction with an incoming call to an outside line. However, if the system is one in which a call can be placed to an extension, the same effects can be obtained by performing a similar operation when the incoming call is to the extension.

Further, the method of wireless control in FIGS. 1, 5 and 7 may be in accordance with the system ID method or an individual ID method. Though a call is described as being an outside line call in the first, second and third embodiments, calls may be extension calls, door intercom calls or private branch calls.

Further, though the first, second and third embodiments are described with regard to wireless telephone calls, the same effects can be obtained by applying the present invention to a wireless communication system in which data communication or the like is performed wirelessly.

Further, if an arrangement is adopted in which the times to which the timers 250, 340 of the first, second and third embodiments are set can be adjusted by an external operation, a system conforming to various applications can be provided.

Thus, in accordance with the embodiments of the invention as described above, if an incoming call arrives at a wireless communication apparatus while the wireless communication apparatus is performing communication or within a prescribed period of time from the end of communication, the wireless link that was established by such communication can be utilized as is, i.e., without being disconnected. As a result, notification of the incoming call and telephone communication can be carried out smoothly without the task of establishing a wireless link anew for the next communication operation and without taking too much time.

Figure 11:
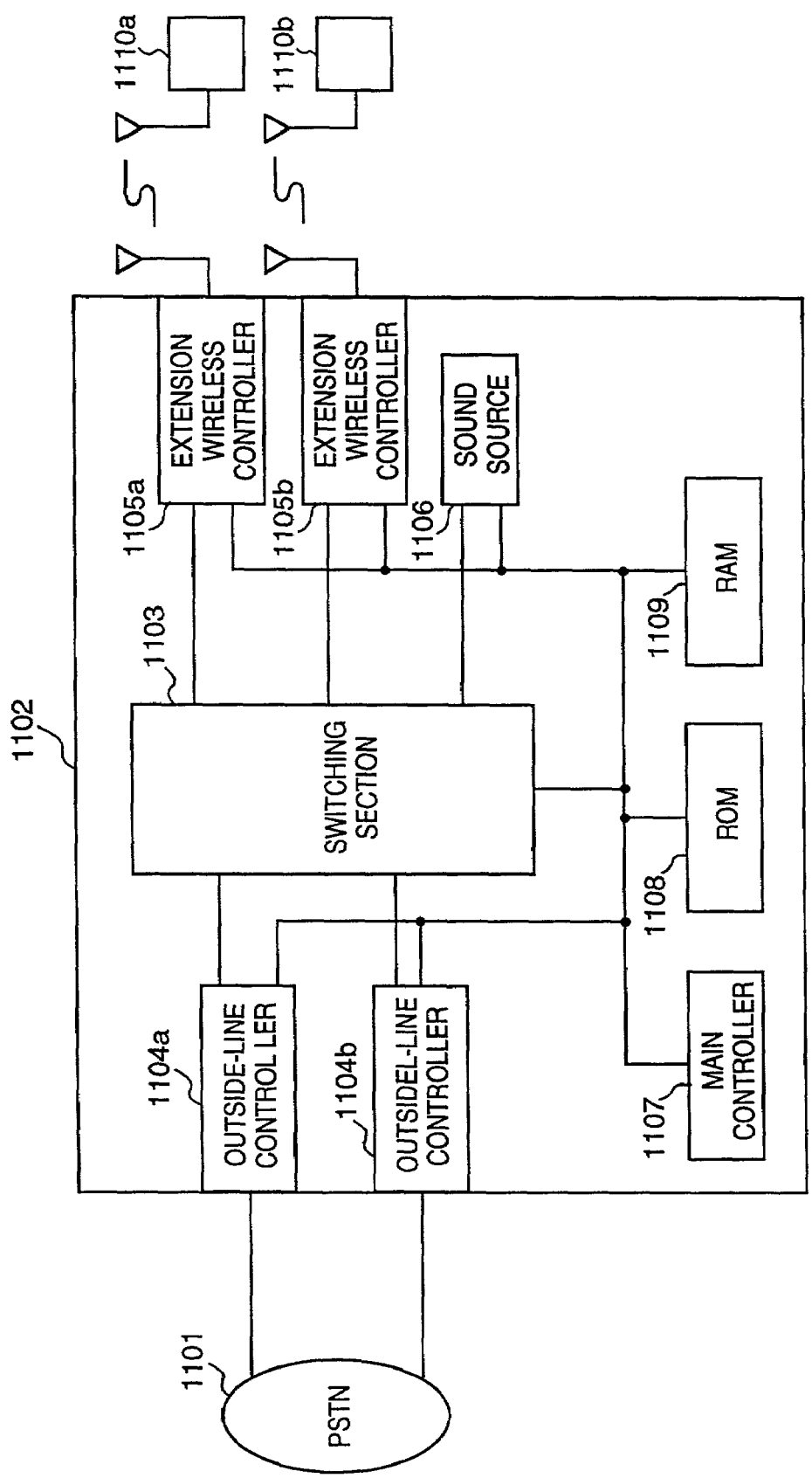
FIG. 11 is a block diagram showing a cordless key telephone system according to a fourth embodiment of the present invention.

FIG. 11 is a block diagram showing the construction of a cordless key telephone system according to a fourth embodiment of the present invention.

A key telephone apparatus has a main unit 1102 which includes a switching section for switching voice calls and the like, outside-line controllers 1104a, 1104b, which accommodate a public switched telephone network (PSTN) 1101, for detecting an incoming call from a telephone line and sending a dialed number to a telephone line, extension wireless controllers 1105a, 1105b for controlling dedicated extension cordless telephones 1110a, 1110b, respectively, a sound source 1106 for generating a DTMF signal sent to a telephone line, a holding tone and various other tones, a main controller 1107 for controlling the cordless key telephone apparatus in various ways, a ROM 1108 storing a control program for controlling a timer used in this embodiment as well as the overall main unit 1102, and a RAM 1109 for storing various data.

The dedicated cordless telephones 1110a, 1110b are connected to the main unit 1102 by wireless links that have been established by a control channel.

Figure 12:
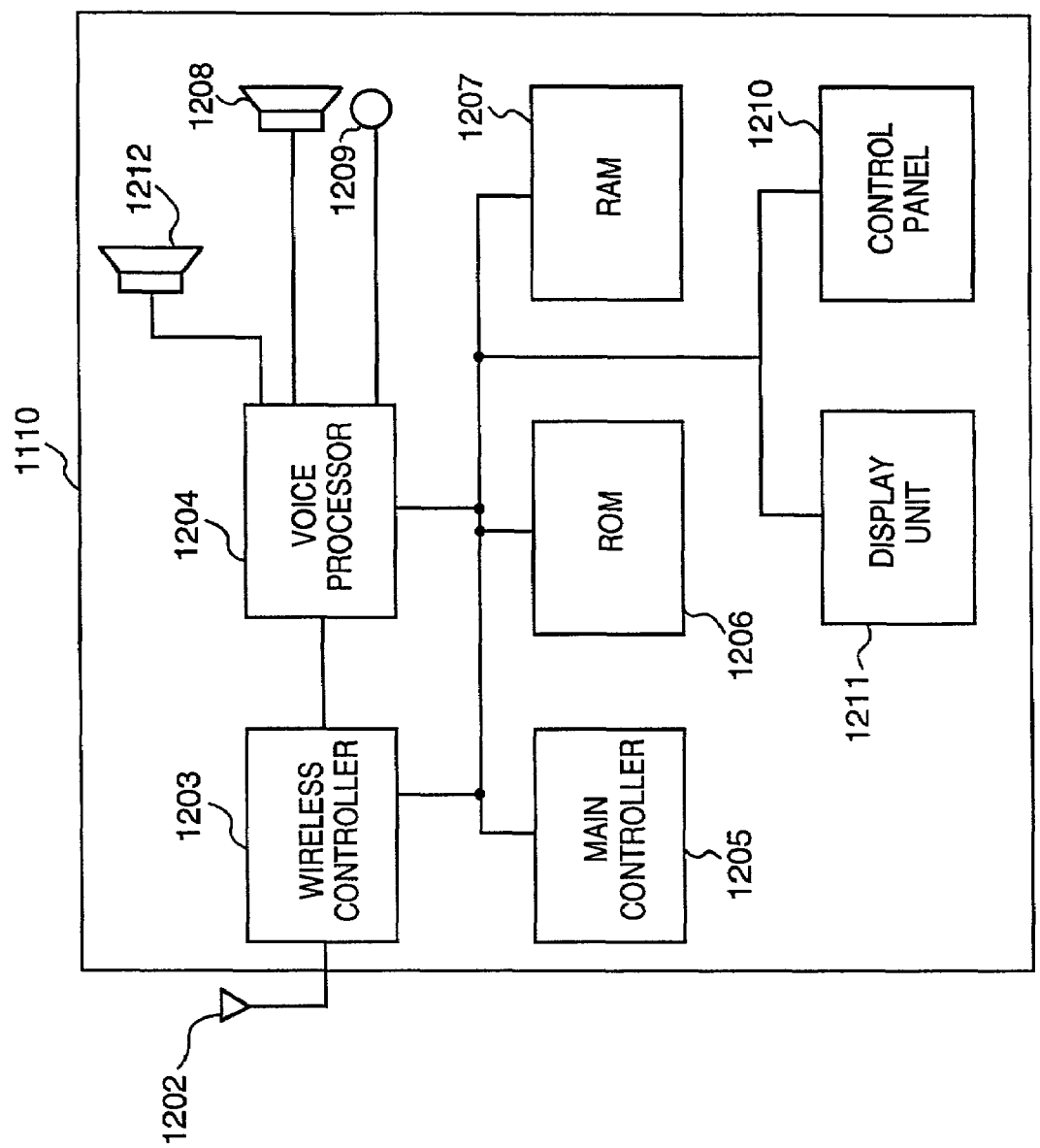
FIG. 12 is a block diagram showing the construction of a dedicated extension cordless key telephone according to the fourth embodiment of the present invention.

FIG. 12 is a block diagram showing the internal construction of the dedicated extension cordless key telephones 1110a, 1110b.

As shown in FIG. 12, the dedicated extension cordless key telephone 1110 includes an antenna 1202 for sending and receiving radio waves, a wireless controller 1203 for sending and receiving radio waves to and from the main unit and detecting whether a wireless link with the main unit has been established, an audio processor 1204 for linking a voice between the main unit and a handset and for sending and receiving control data to and from the main unit, a main controller 1205 for controlling this mobile device in various ways, a ROM 1206 in which a control program and the like are stored, a RAM 1207 for storing various data, an earphone 1208, a microphone 1209, a control panel 1210 having outside-line buttons, push buttons for dialing and a hold button, etc., a display unit 1211 comprising a liquid-crystal display device or LEDs (light-emitting diodes), and a speaker 1212 for sending an incoming-call tone.

When the dedicated extension cordless key telephone 1110*a* is taken off the hook in order to make a transmission to the PSTN 1101, a procedure for establishing a wireless link between the dedicated extension cordless key telephone 1110*a* and the extension wireless controller 1105 is executed. After the wireless link is established, off-hook information is transmitted from the dedicated extension cordless key telephone 1110*a* to the extension wireless controller 1105*a*.

Upon receiving the off-hook information from the dedicated extension cordless key telephone 1110*a*, the extension wireless controller 1105*a* communicates this information to the main controller 1107.

Upon receiving the off-hook information, from the dedicated extension cordless key telephone 1110*a*, sent by the extension wireless controller 1105*a*, the main controller 1107 causes the outside-line controller 1104*a* to acquire a telephone line.

Thereafter, when a dial button on the dedicated extension cordless key telephone 1110*a* is pushed, a dialing signal is sent to the extension wireless controller 1105*a* by the established wireless link, the extension wireless controller 1105*a* communicates the dialing signal to the main controller 1107, and the latter sends the signal from the outside-line controller 1104*a* to the telephone line.

When the subscriber's number of the communicating party (not shown) has been dialed in full, the number is terminated at the communicating party and the party answers, it becomes possible for the communicating party to communicate with the dedicated extension cordless key telephone 1110*a* via the PSTN 1101 and the outside-line controller 1104*a*, switching section 1103 and extension wireless controller 1105 in the main unit 1102.

When there is an incoming call from a telephone line, the outside-line controller 1104*a* detects the incoming call and communicates the incoming-call information to the main controller 1107.

Upon being notified of the incoming-call information, the main controller 1107 establishes a wireless link between the extension wireless controllers 1105*a* and 1105*b* and the dedicated extension cordless key telephones 1110*a*, 1110*b* in order to produce an incoming-call tone.

The extension wireless controllers 1105*a* and 1105*b* execute a procedure for establishing a wireless link with the dedicated extension cordless key telephones 1110*a* and 1110*b*. When this procedure is completed, the extension wireless controllers 1105*a* and 1105*b* communicate establishment-completed information to the main controller 1107.

Upon receiving the establishment-completed information, the main controller 1107 causes the extension wireless controllers 1105*a*, 1105*b* to send incoming-call information to the dedicated extension cordless key telephones 1110*a*, 1110*b*.

Furthermore, the main controller 1107 transmits; the incoming-call tone from the sound source 1106 to the dedicated extension cordless key telephones 1110*a*, 1110*b* via the switching section 1103 and extension wireless controllers 1105*a*, 1105*b* so that the incoming-call tone is produced by the speaker 1212 of each of the dedicated extension cordless key telephones 1110*a* and 1110*b*.

When the dedicated extension cordless key telephone 1110*b* is taken off the hook in response to the incoming call, an operation similar to that performed at the time of transmission is carried out. Specifically, the off-hook information is transmitted, this information is communicated from the extension wireless controller 1105*b* to the main controller 1107, the main controller 1107 causes the outside-line controller 1104*a* to acquire a telephone line, a response is made to the incoming call and communication with the originating party (not shown) can be achieved in the same manner as at the time of transmission.

Figure 13:
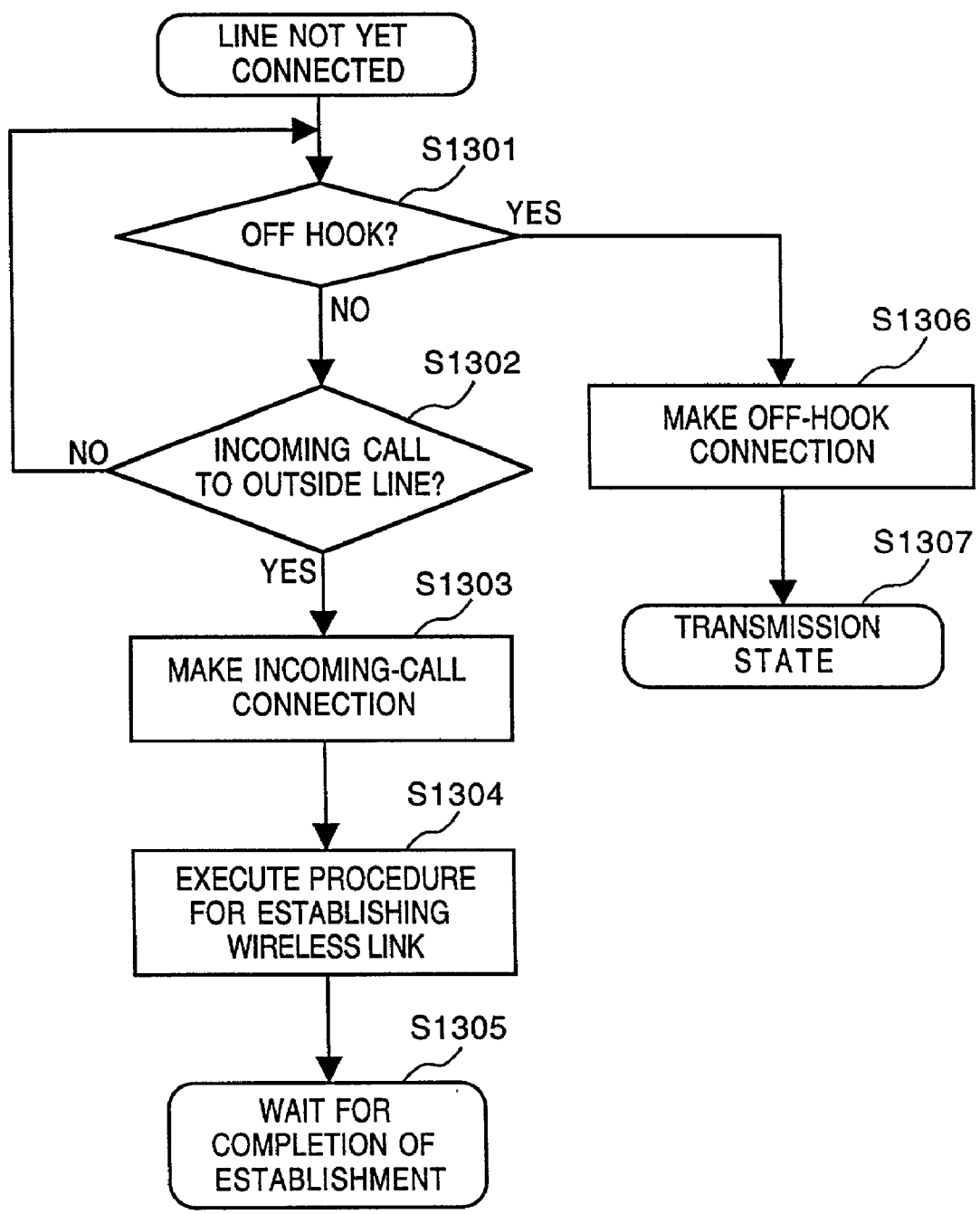
FIG. 13 is a flowchart showing an operation in which a main unit stores the status that prevails when a wireless link is connected in the fourth embodiment.

Next, an operation for storing the status of the main unit 1102 when a wireless link is established will be described in conjunction with the flowchart of FIG. 13.

In a state in which a wireless link has not been established between the extension wireless controller 1105*a* and the dedicated extension cordless key telephone 1110*a*, the main controller 1107 waits for notification of the off-hook information, from the dedicated extension cordless key telephone 1110*a*, sent by the extension wireless controller 1105*a* (step S1301). If the information is not communicated to the main controller 1107, the main controller 1107 waits for notification of incoming-call information, from the telephone line, sent by the outside-line controller 1104*a* (step S1302). If the incoming-call information is not received, the program returns to step S1301.

If the off-hook information from the dedicated extension cordless key telephone 1110*a* has been communicated at step S1301, the fact that a connection has been made by the off-hook operation is stored in the RAM 1109 as the status at the time the wireless link is established (step S1306). A transition is then made to the transmission state (step S1307).

If the incoming-call information indicative of the incoming call to the outside line is communicated at step S1302, then the fact that an incoming-call connection has been made is stored in the RAM 1109 as the status at the time the wireless link is established (step S1303) and the extension wireless controller 1105*a* is made to execute the procedure for establishing the wireless link (step S1304). A transition is then made to step S1305, at which completion of wireless-link establishment is awaited.

Thus, status at establishment of the wireless link with a dedicated extension cordless key telephone is stored in the RAM 1109 by the main unit 1102.

Figure 14:
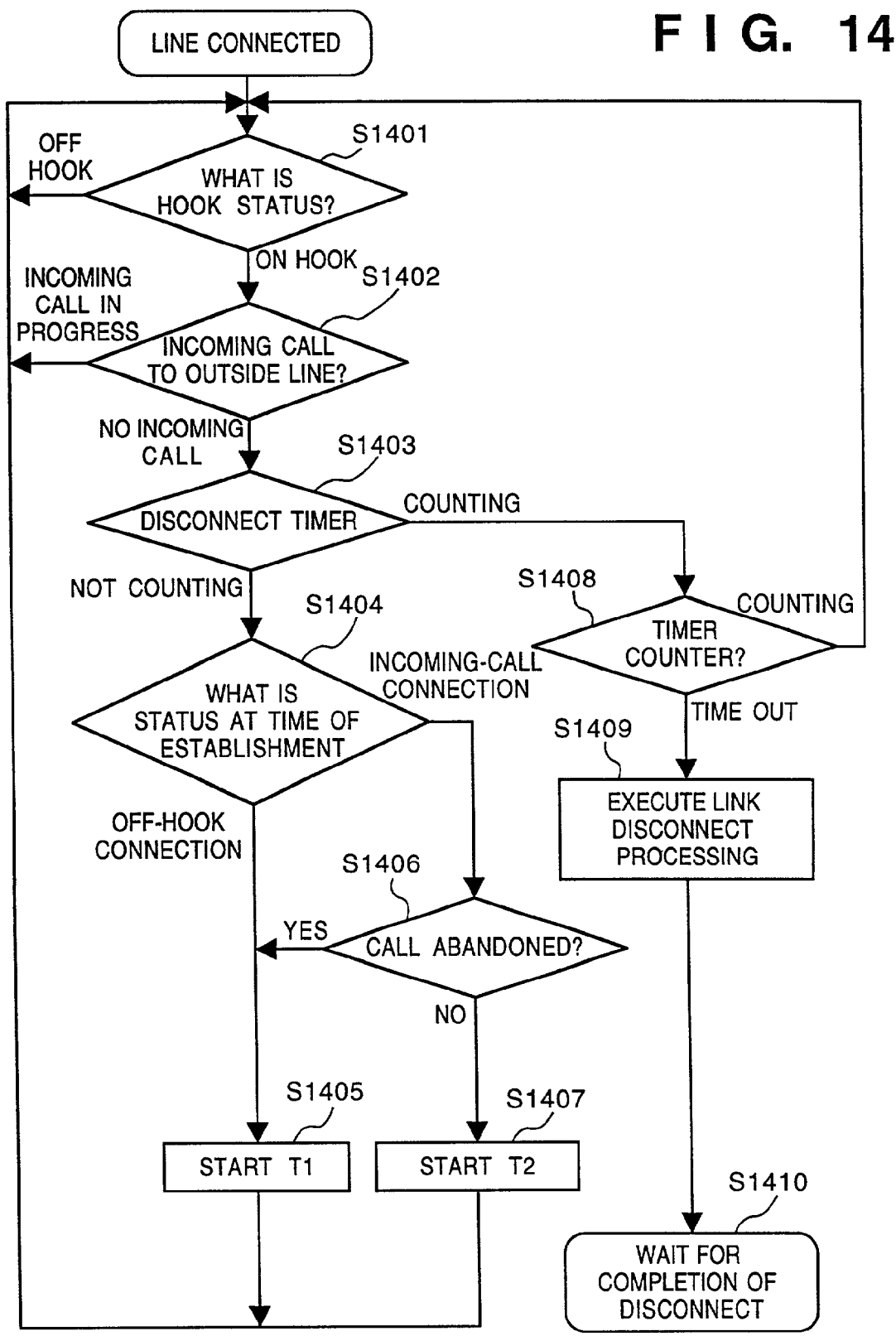
FIG. 14 is a flowchart showing an operation performed when a wireless link is disconnected in the fourth embodiment.

The operation of main unit 1102 when a wireless link is cut will now be described in conjunction with the flowchart of FIG. 14.

When the extension wireless controller 1105*a* and the dedicated extension cordless key telephone 1110*a* are wirelessly linked, the main controller 1107 monitors the hook status of the dedicated extension cordless key telephone 1110*a* (step S1401). If the telephone is off the hook, the program returns to step S1401. If the telephone is on the hook, the main controller 1107 monitors the incoming-call status of the outside line (step S1402). If an incoming call is still in progress, the program returns to step 1401. If there is no incoming call, the main controller 1107 checks a disconnect timer (step 1403). If the timer is not operating, the main controller 1107 checks the status, stored in the RAM 1109, that prevailed when the wireless link was established (step S1404). In case of an off-hook connection, namely disconnection due to placing the telephone on the hook, the main controller 1107 starts a timer T1 (e.g., 5 sec) (step S1405). In case of an incoming-call connection, the main controller 1107 checks whether the incoming call was suspended (step S1406). If the call was abandoned from the originating side in mid-course, the program proceeds to step S1405, where the disconnect timer T1 is started.

If the call from the originating side is not abandoned at step S1406 and the dedicated extension cordless key telephone 1110*b* responds to the incoming call, the main controller 1107 starts a disconnect timer T2 (e.g., 20 sec), which has been set to a time longer than that of the disconnect timer T1, and the program returns to step S1401.

If the disconnect timer has already been started at step S1403, the timer performs a counting operation (step S1408) and the program returns to step S1401 if the timer has not run out of time. If the timer has run out of time, the timer is halted and a procedure for cutting the wireless link is started (step S1409), after which the program makes a transition to step S1410 to wait for completion of the wireless-link disconnection.

It should be noted that the timer simply performs a counting operation at step S1408. However, if the timer value is set and time is counted down when the disconnect timer T1 or T2 is started, it is possible to execute processing regardless of whether the timer that has started is T1 or T2.

Thus, it is so arranged that when an operation for responding to an incoming call is detected, the wireless link with the extension cordless telephone is cut after a prescribed period of time which is longer than that when an outgoing call is abandoned in mid-course or when the telephone is placed on the hook.

Operation up to the response to an incoming call to an outside line and the placing of an outside line on hold during a call will now be described in accordance with the sequence chart of FIG. 15.

When there is an incoming call from a public telephone line, the main controller 1107 transmits wireless-link establishment request information to the extension wireless controller 1105*a* (1501, 1502).

Upon receiving the wireless-link establishment request information (1501, 1502), the extension wireless controller 1105 transmits a wireless-link establishment signal (1503) to the extension cordless telephone 1110*a* by a control channel.

At this time the call channel used between the extension wireless controller 1105*a* and the extension cordless telephone 1110*a* is communicated by the wireless-link establishment signal (1503) and the radio-wave receiving section is switched over to the call channel, thereby establishing a wireless link.

Meanwhile, since the control channel is already being used, the extension wireless controller 1105*b* waits for the control channel to become idle.

Upon receiving the wireless-link establishment signal (1503), the extension cordless telephone 1110*a* transmits a wireless-link establishment notification signal (1504) by the designated call channel.

Upon receiving the wireless-link establishment notification signal (1504), the extension wireless controller 1105*a* transmits a wireless-link establishment response signal (1505) to the extension cordless telephone 1110*a* and transmits wireless-link establishment confirmation information (1506) to the main controller 1107, thereby notifying of the fact that the wireless link has been established.

The extension wireless controller 1105 detects the idle control channel, transmits a wireless-link establishment request signal (1507) to the extension cordless telephone 1110*b* by the control channel, notifies of the call channel to be used subsequently and switches the radio-wave receiving section over to the call channel, thereby establishing a wireless link.

Upon receiving the wireless-link establishment confirmation information (1506) from the extension wireless controller 1105*a*, the main controller transmits outside-line incoming-call information (1508) to the extension wireless controller 1105*a*. Upon receiving this information, the extension wireless controller 1105*a* transmits an outside-line incoming-call signal (1509), which includes an outside-line ringing tone and outside-line LED information, to the extension cordless telephone 1110*a*.

Upon receiving the outside-line incoming-call signal (1509), the extension cordless telephone 1110*a* produces an outside-line incoming-call tone by the ringing tone designated by the outside-line incoming-call signal (1509) and causes outside-line LEDs to light in the pattern designated by the signal (1509).

After the wireless-link establishment request signal (1507) has been sent and received, the extension wireless controller 1105*b* and extension cordless telephone 1110*b* perform operations (1510~1513) similar to those described above, cause the outside-line incoming-call tone to be produced by the extension cordless telephone 1110*b* and cause the outside-line LEDs to be lit.

Thereafter, when the extension cordless telephone 1110*a* is taken off the hook in order to answer the incoming call to the outside line, the extension cordless telephone 1110*a* transmits an off-hook signal (1514) to the extension wireless controller 1105*a*, which in turn transmits off-hook information (1515) to the main controller 1107.

Upon receiving the off-hook information (1515), the main controller 1107 causes: the outside-line controller 1104 to acquire the outside line terminating the call, connects the switching section 1103 and makes possible an outside-line call by the extension cordless telephone 1110*a*.

Since the incoming call to the outside line has been responded to with regard to the extension cordless telephone 1110*b*, it is necessary to halt the outside-line incoming-call tone and communicated new outside-line LED information. Accordingly, outside-line incoming-call abandonment information (1516) is transmitted to the extension wireless controller 1105 and the timer T2, which runs until the wireless link is cut off, is started.

Upon receiving the outside-line incoming-call abandonment information (1516), the extension wireless controller 1105*b* transmits an outside-line incoming-call abandonment signal (1517) to the extension cordless telephone 1110*b*. Upon receiving the signal (1517), the extension cordless telephone 1110*b* halts the outside-line incoming-call tone and causes the outside-line LEDs to light in the pattern designated by the outside-line incoming-call abandonment signal (1517).

Thereafter, when the timer T2 runs out of time, the main controller 1107, in order to cut off the wireless link, transmits wireless-link disconnect request information (1518) to the extension wireless controller 1105*b*. Upon receiving this information, the extension wireless controller 1105*b* transmits a disconnect request signal (1519) to the extension cordless telephone 1110*b*.

Upon verifying completion of reception of the disconnect request signal (1519) at the extension cordless telephone 1110*b*, the extension wireless controller 1105*b*, as well as the extension cordless telephone 1110*b*, halts the transmission of radio waves and cuts the wireless link.

When, during an outside-line call, a holding operation is performed at the extension cordless telephone 1110*a* in order to transfer or temporarily hold the call that is in progress, a hold signal is transmitted from the extension cordless telephone 1110*a* to the extension wireless controller 1105*a*. Upon receiving this signal, the extension wireless controller 1105*a* transmits holding information to the main controller 1107.

Upon receiving the holding information, the main controller 1107 sends a holding tone to the outside line and transmits outside-line holding information (1522, 1523) to the extension wireless controllers 1105a, 1105b.

Upon receiving the outside-line holding information (1522) from the main controller 1107, the extension wireless controller 1105a transmits an outside-line hold signal (1524) to the extension cordless telephone 1110a by the call channel since the wireless link has already been established.

Meanwhile, upon receiving the outside-line holding information (1523), the extension wireless controller 1105b transmits an outside-line hold signal (1525) to the extension cordless telephone 1110b by the control channel since a wireless link with the extension cordless telephone 1110b has not been established.

Upon receiving the outside-line hold signals (1524, 1525), the extension cordless telephones 1110a, 1110b light the outside-line LEDs in the patterns designated by the outside-line hold signals (1524, 1525).

Figure 15:
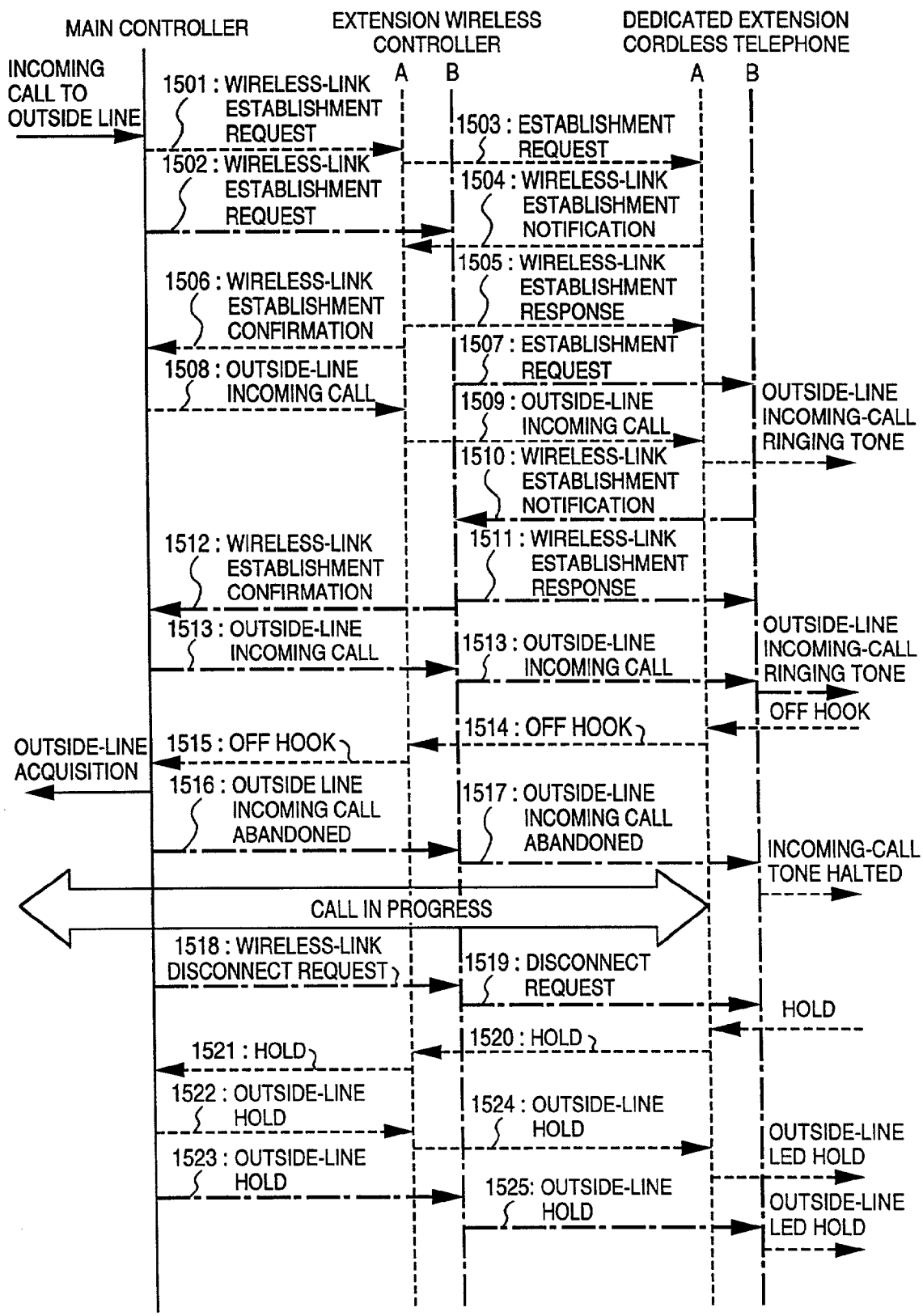
FIG. 15 is a sequence chart showing operation up to response and holding of an incoming call to an outside line in the fourth embodiment.

Further, the holding operation of FIG. 15 is performed after the wireless link between the extension wireless controller 1105b and extension cordless telephone 1110b is cut. However, if the holding operation is performed before the wireless link is cut, the transmission of the outside-line hold signal (1525) to the extension cordless telephone 1110b is performed by the call channel.

Thus, it is possible to answer an incoming call to an outside line and place the call in progress on hold.

Figure 16:
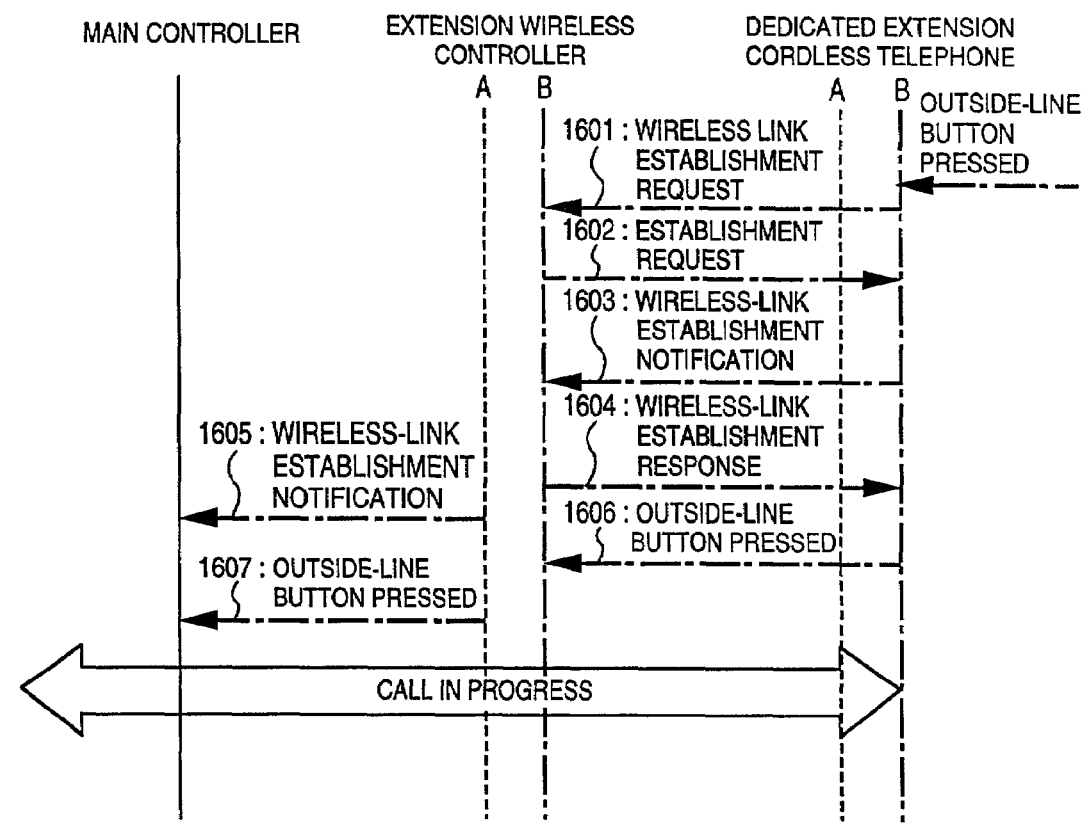
FIG. 16 is a sequence chart showing operation when a hold response is made from a state in which a wireless link is disconnected in the fourth embodiment.
Figure 17:
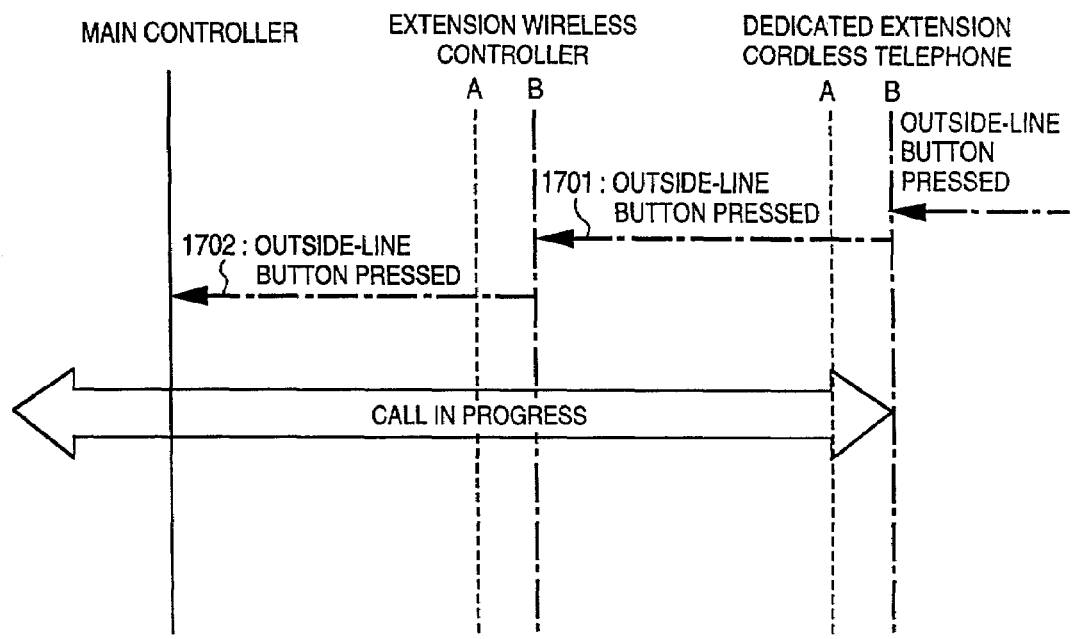
FIG. 17 is a sequence chart showing operation when made from a state in which a wireless link is disconnected in the fourth embodiment.
Figure 18:
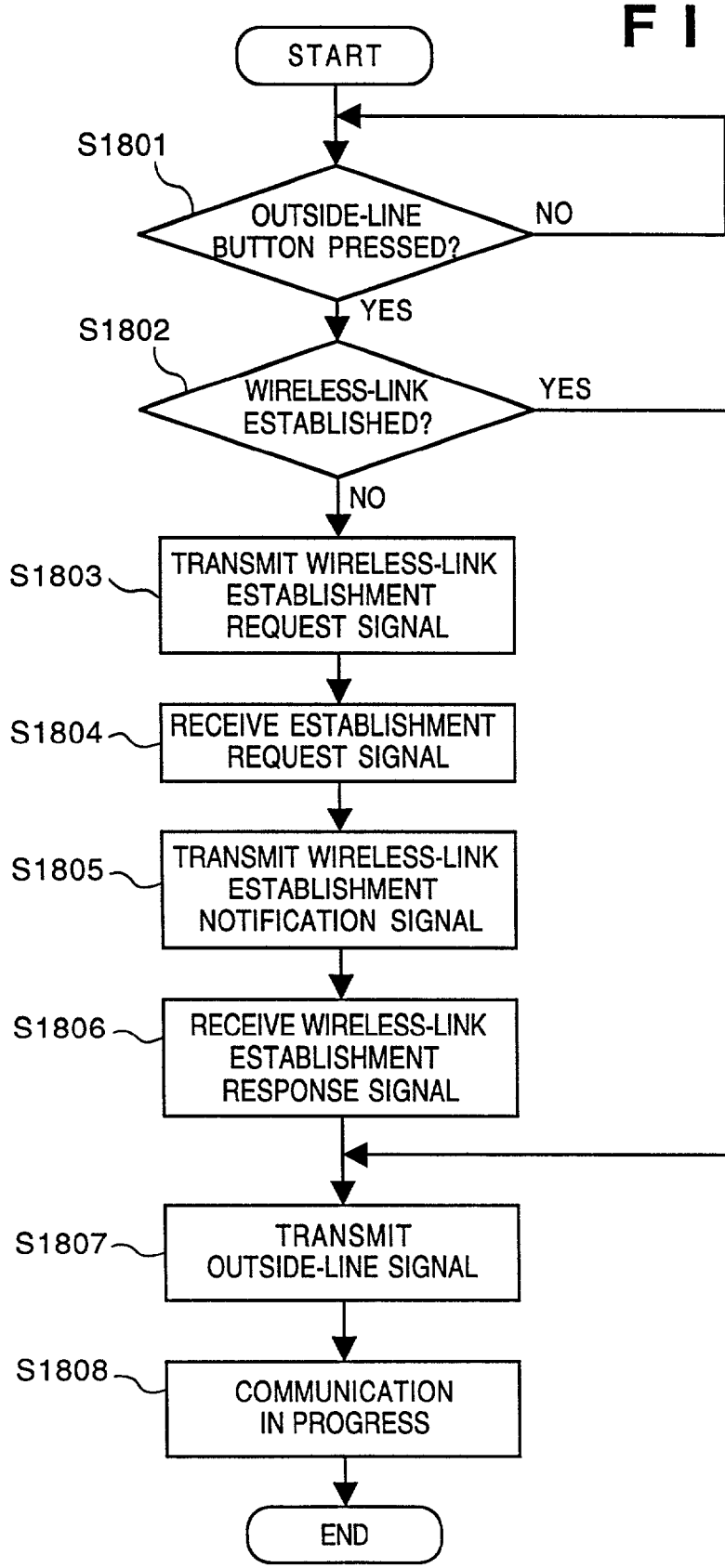
FIG. 18 is a flowchart showing operation of a dedicated extension cordless telephone at the time of a made in the fourth embodiment.

Described next will be the sequence chart of FIG. 16 showing operation when an outside-line button is pressed on the extension cordless telephone 1110b at such time that an outside line of the extension cordless telephone 1110a has been placed on hold, the sequence chart of FIG. 17 showing operation when a response is made to the holding outside line at the extension cordless telephone 1110b in a state in which the timer T2 is counting and a wireless link remains as established, and the flowchart of FIG. 18 illustrating these operations.

When the outside-line button on the extension cordless telephone 1110b is pressed in order to respond to the holding outside line (step S1801), the extension cordless telephone 1110b checks, using the wireless controller 1203, whether the wireless link has been established (step S1802). If the wireless link has been cut, the extension cordless telephone 1110b transmits a wireless-link establishment request signal (1601) to the extension wireless controller 1105b by the control channel in order to establish the wireless link (step S1803).

Upon receiving the wireless-link establishment request signal (1601), the extension wireless controller 1105b transmits an establish request signal (1602) to the extension cordless telephone 1110b by the control channel, designates the call channel to be used and switches the receiving section, which receives radio waves from the extension cordless telephone 1110b, over to the call channel, thereby establishing a wireless link.

Upon receiving the establish request signal (1602) at step S1804, the extension cordless telephone 1110b transmits a wireless-link establishment notification signal (1603) by the designated call channel (step S1805). Upon receiving this signal, the extension wireless controller 1105b transmits a wireless-link establishment response signal (1604) to the extension cordless telephone 1110b by the call channel and transmits wireless-link establishment notification information (1605) to the main controller 1107.

Upon verifying, owing to reception of the wireless-link establishment response signal (1604) from the extension wireless controller 1105b (step S1806), that the wireless link has been established, the extension cordless telephone 1110b transmits an outside-line button signal (1606) to the extension wireless controller 1105b (step S1807). Upon receiving this signal, the extension wireless controller 1105b sends the main controller 1107 information (1607) indicating depression of the outside-line button.

Upon receiving the information (1607), the main controller 1107 changes over the switching section 1103 and connects the call channel of the holding outside line from the extension wireless controller 1105a to the extension wireless controller 1105b, thereby making possible an outside-line call at the extension cordless telephone 1110b (step S1808).

If it is determined at step S1802 that the wireless link has been established, a signal (1701) indicating depression of the outside-line button is transmitted to the extension wireless controller 1105b (step 1807) owing to the fact that the wireless link has been established.

Upon receiving the signal (1701), the extension wireless controller 1105b sends the main controller 1107 information (1702) indicating depression of the outside-line button. Upon receiving this information, the main controller 1107 changes over the switching section 1103, connects the call channel of the holding outside line to the extension wireless controller 1105b and makes possible an outside-line call at the extension cordless telephone 1110b (step S1808).

More specifically, if the established wireless link remains in effect when a transfer is made to another telephone or a hold response is made at another telephone after the response to the incoming call from the telephone line is made, the sending/receiving of signals at S1803~S1806 described in FIG. 18 and the sending/receiving of signals 1601~1604 and sending/receiving of information 1605 in FIG. 16 can be eliminated. The time required to hold and respond to an outside line and make a call possible can be shortened.

More specifically, as described in connection with FIG. 14, when the main unit detects an operation for responding to an incoming call, the time required to cut the wireless links between the main unit and extension cordless telephones other than that which performed the response operation is made longer than the time for cutting the wireless link by hanging up or by abandonment of the call on the originating side. As a result, the time needed for a hold response on the outside line can be shortened, as set forth above.

A fifth embodiment of the present invention will now be described.

In the fourth embodiment, it is so arranged that when an off-hook connection has been made on a wireless link, the set value of the disconnect timer of extension cordless telephones other than the extension cordless telephone that has answered is changed depending upon whether an outgoing call is abandoned by the originating side in mid-course or an operation is made to respond to an incoming call. In the fifth embodiment, it is so arranged that when an extension cordless telephone has performed an operation to respond to an incoming call, the wireless links to extension cordless telephones other than the extension cordless telephone that has responded are not cut.

Figure 19:
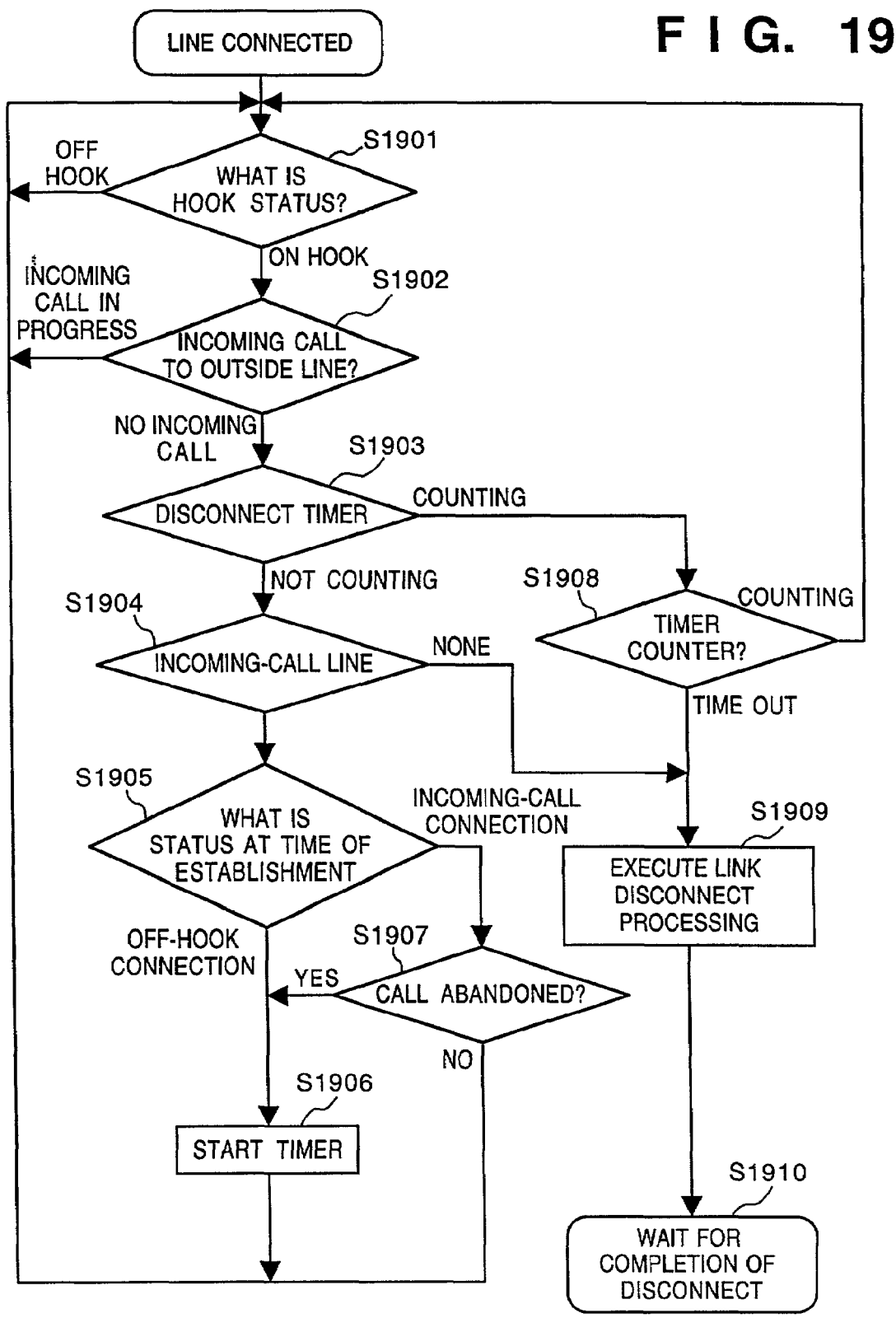
FIG. 19 is a flowchart showing an operation in which a wireless link with a cordless telephone is not cut during acquisition of a telephone line when a terminate-and-answer operation has been detected in a fifth embodiment of the present invention.

Reference will be had to the flowchart of FIG. 19 to describe an operation in which, when the main unit 1102 has detected an operation by the extension cordless telephone 1110a to respond to an incoming call, the wireless link of the extension cordless telephone 1110b, which is other than the extension cordless telephone that responded, is not disconnected during acquisition of a telephone line.

In FIG. 19, steps S1901~S1903 are the same as steps S1401~S1403, and steps S1908, S1909 are the same as steps S1408, S1409. These steps need not be described again.

The operating status of the disconnect timer is checked at step S1903. If the timer is not operating, monitoring is performed (step S1904) to determine whether the outside line responded to by the extension cordless telephone 1110*b* is continuing the call. If the call is continuing, the status, stored in the RAM 1109, that prevailed when the wireless link was established is checked (step S1905). In case of an off-hook connection, i.e., in case of disconnection owing to hanging up of the phone, the disconnect timer (e.g., 5 sec) is started (step S1906). In case of an incoming-call connection, whether the incoming call was suspended is checked (step S1907). If the call was abandoned from the originating side in mid-course, the program proceeds to step S1906, where the disconnect timer is started. The program then returns to step S1901.

If the call from the originating side is not abandoned at step S1907 and the other dedicated extension cordless key telephone 1110*b* responds to the incoming call, the program returns to step S1901 without starting the timer.

If the outside line responded to at step S1904 has been disconnected, a procedure for cutting the wireless link is started (step S1909) and the program makes a transition to step S1910 to wait for completion of the wireless-link disconnection.

Thus, when the main unit 1102 has detected an operation for responding to an incoming call, the wireless links with all dedicated extension cordless telephones are not cut during acquisition of a telephone that has responded to an incoming call. When the telephone that has responded to an incoming call is disconnected, it is possible to cut the wireless links with all dedicated extension cordless telephones.

Figure 20:
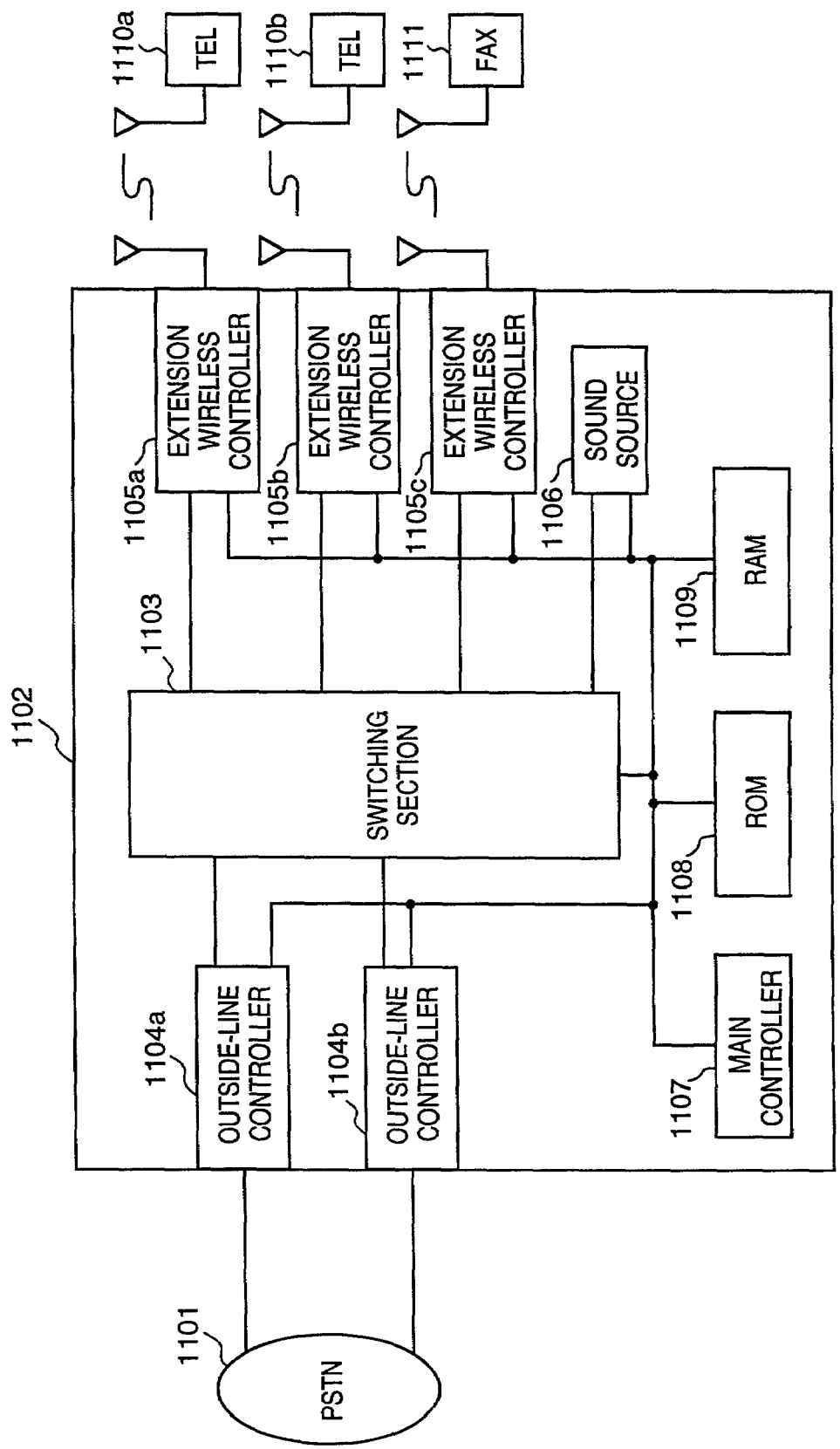
FIG. 20 is a block diagram illustrating the construction of a system according to a sixth embodiment of the present invention.

FIG. 20 is a diagram showing the construction of a system according to a sixth embodiment of the invention.

The system of FIG. 20 is additionally provided with an extension wireless controller 1105*c* and a wireless facsimile device 1111. The other components are the same as shown in FIG. 11 and need not be described again.

The wireless facsimile device 1111 performs facsimile communication via the PSTN 1101, and the extension wireless controller 1105*c* is for controlling the wireless facsimile device 1111. The type (telephone, facsimile, etc.) of extension device connected to each extension wireless controller is stored in the RAM 1109 in advance.

In a case where a wireless data communication device such as the facsimile device in included in the system, as shown in FIG. 20, the probability that a transfer from the extension cordless telephones 1110*a*, 1110*b* will be made is low. Therefore, in this embodiment, the cutting of the wireless link of the wireless facsimile device 1111 is performed as in the fourth and fifth embodiments, namely at the time of off-hook connection or when an outgoing call is abandoned on the originating side.

Figure 21:
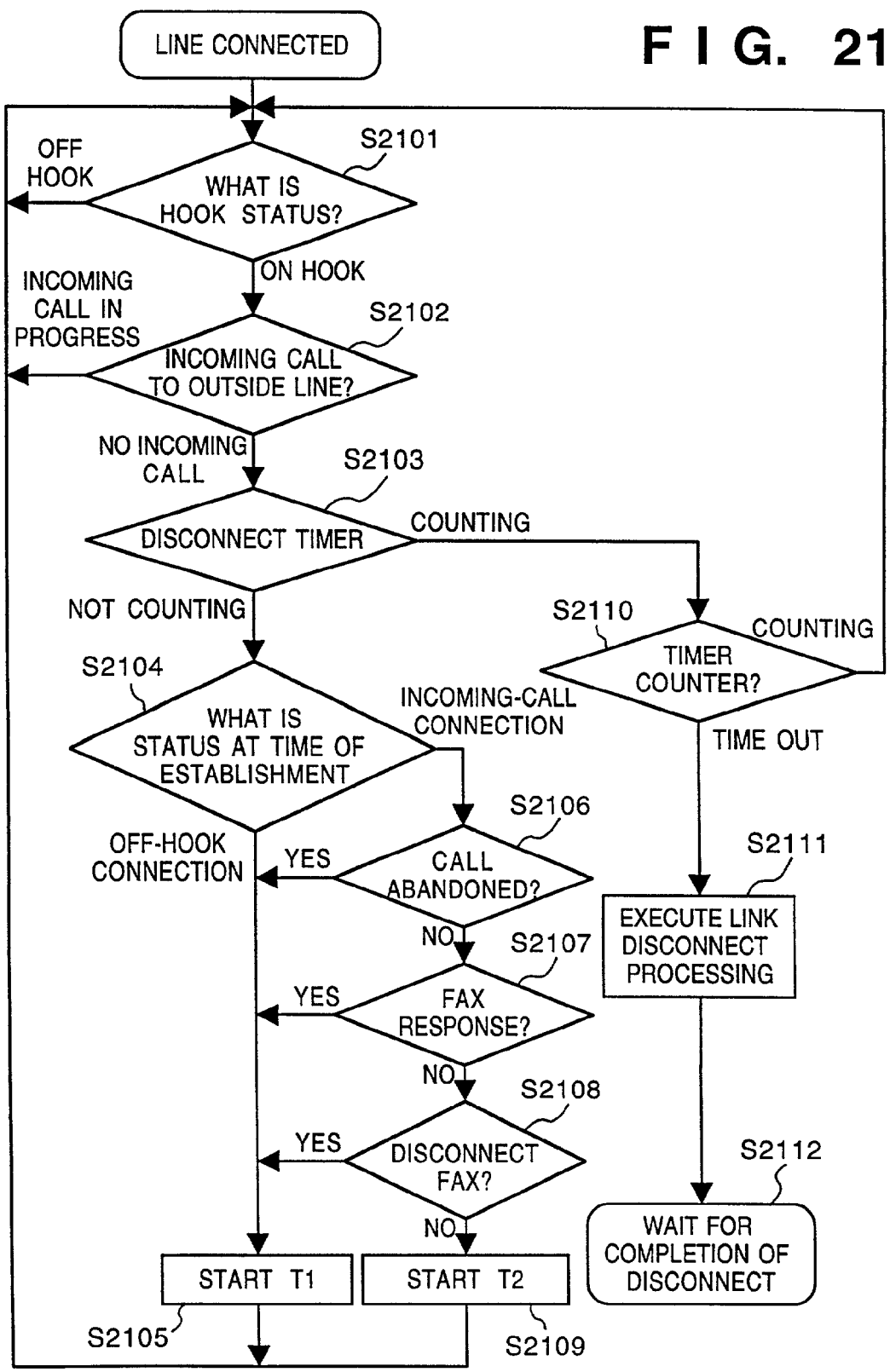
FIG. 21 is a flowchart showing operation of a main unit according to the sixth embodiment.

FIG. 21 is a flowchart illustrating the operation of the main unit in this embodiment. Operation in accordance with this flowchart will now be described.

When a wireless link has been established between the extension wireless controller 1105 and the extension cordless telephones 1110 and wireless facsimile device 1111, the main controller 1107 monitors the hook status of the extension cordless telephones 1110*a*, 1110*b* and wireless facsimile device 1111 (step S2101). If any one of the extension cordless telephones 1110*a*, 1110*b* or wireless facsimile device 1111 is off the hook, the program returns to step S2101. If any one of these is on the hook, the main controller 1107 monitors the incoming-call status of the outside line (step S2102). If the incoming call is continuing, the program returns to step 2101. If there is no incoming call, the main controller 1107 checks a disconnect timer (step 2103). If the timer is not operating, the main controller 1107 checks the status, stored in the RAM 1109, that prevailed when the wireless link was established (step S2104). In case of an off-hook connection, the main controller 1107 starts the timer T1 (step S2105). In case of an incoming-call connection, the main controller 1107 checks whether the incoming call was suspended (step S2106).

If the call was abandoned from the originating side in mid-course, the program proceeds to step S2105, where the disconnect timer T1 is started.

If the call from the originating side is not abandoned at step S2106, an incoming-call response is made at step S2107 after judging whether the wireless terminal is an extension cordless telephone or the wireless facsimile machine. If the wireless terminal is the facsimile device 1111, the timer T1 is started in order to cut the wireless link with the other wireless terminals (the extension cordless telephones 1110*a*, 110*b*).

If the extension cordless telephone has responded to the incoming call at step S2107, then the program proceeds to step S2108.

It is determined at step S2108 whether the wireless link to be cut is that of the extension cordless telephones or of the wireless facsimile device. In case of the wireless facsimile device, the program proceeds to step S2105. If the wireless link cut is that of the extension cordless telephones, the disconnect timer T2, which has been set to a time longer than that of the disconnect timer T1, is started at step S2109. and the program returns to step S1401.

If the disconnect timer has already been started at step S2103, the timer performs a counting operation (step S2110) and the program returns to step S2101 if the timer has not run out of time. If the timer has run out of time, the timer is halted and a procedure for cutting the wireless link is started (step S2111), after which the program makes a transition to step S2112 to wait for completion of the wireless-link disconnection.

Thus, in a case where the system incorporates devices having various functions, the time up to cutting of the wireless link can be changed depending upon the communication function of the device.

In the fourth through sixth embodiments, the set time of the disconnect timer T2 is longer than that of the disconnect timer T1. This set time is a fixed time period. However, in a seventh embodiment, it is so arranged that the set time of the disconnect timer T2 can be changed by the operation in dependence upon application in which the system is put to use.

Figure 22:
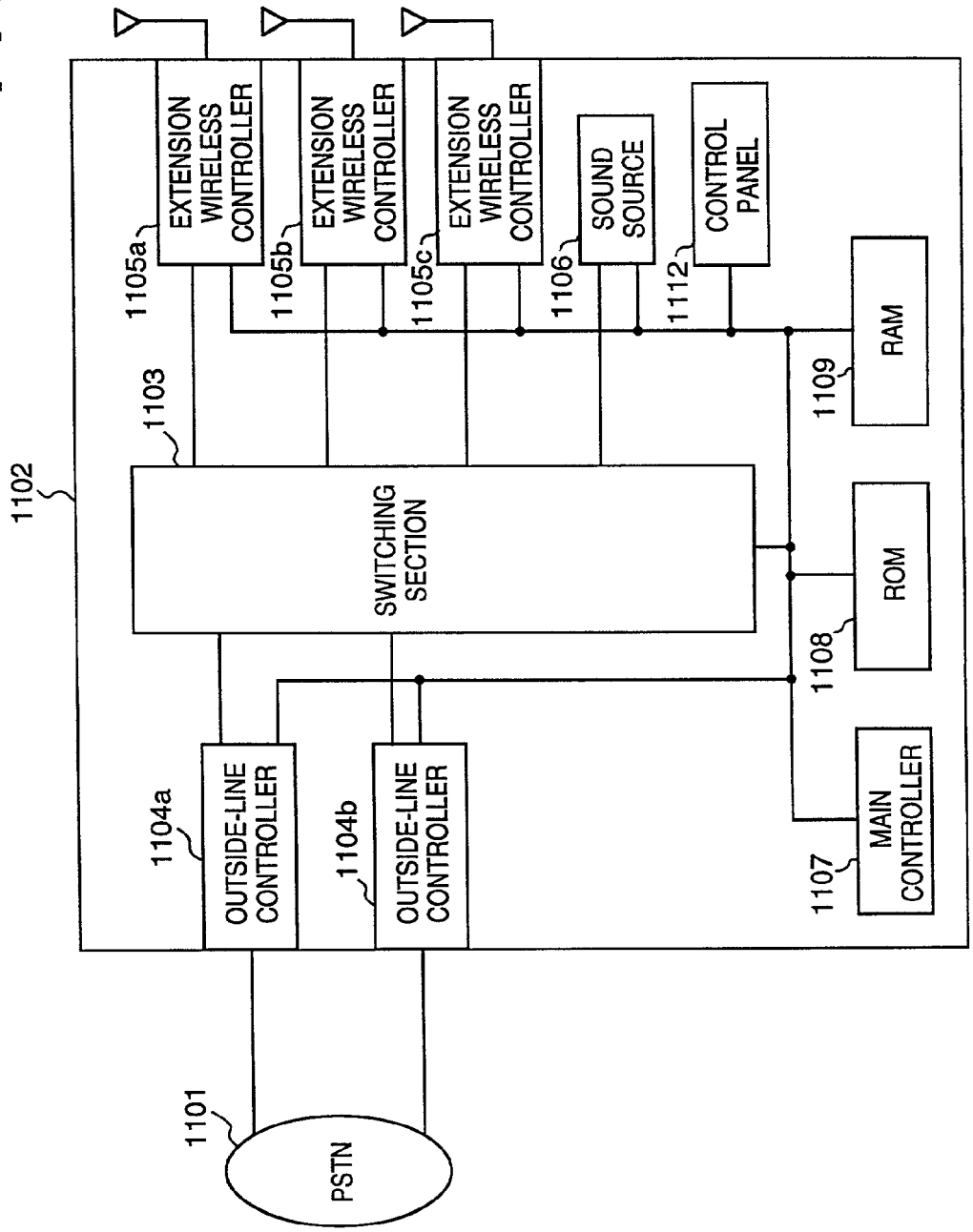
FIG. 22 is a block diagram showing the construction of a main unit according to a seventh embodiment of the invention.

FIG. 22 is a diagram showing the construction of the main unit 1102 according to the seventh embodiment.

In FIG. 22, numeral 1112 denotes a control panel, which is provided with a switch of the kind shown in FIG. 23. This makes it possible to freely change the set time of the disconnect timer T2. Other components in FIG. 22 are the same as those in FIG. 20 and need not be described again.

In FIG. 23, numeral 2301 denotes a control panel having a display 2302 which displays the set time of the disconnect timer T2. By moving a variable switch 2303, the time of the disconnect timer T2 can be set with facility.

A control panel of this kind can be provided in the apparatus of the first through third embodiments, thereby making it possible to change the set values of the timers 250, 340.

In the first through seventh embodiments, the example of the wireless link described relies upon radio waves from a low-power system. However, it is obvious that the present invention can be implemented in a similar manner also in various wireless telephone systems in which wireless communication relies upon very low-power radio waves or other radio waves, light such as infrared rays, etc. There is no particular limitation upon the type of wireless link.

The arrangement of the cordless key telephone apparatus shown in FIG. 11 is only one example and it goes without saying that there are many other arrangements available. The invention is not limited to a key telephone apparatus. It is obvious that the invention is applicable in similar fashion to a cordless telephone system in a public branch exchange or business office.

With regard to the type of outside line, the invention is not limited to an ordinary public telephone line. The line may be an extension in a public branch exchange (PBX), a digital line typified by an ISDN, a special-purpose line or a line in a private network.

There is no limitation upon the type of extension terminal accommodated. If a plurality of dedicated cordless telephones are accommodated, dedicated telephones, ordinary subscriber telephones (SLTs), facsimile machines or other telephone terminals conventionally connected to the main unit by lines may be accommodated.

The extension wireless controllers are accommodated within the main unit. However, they may be provided outside the main unit and connected thereto by line wires.

In the foregoing embodiments, the timers in the main controller are described as being software. However, hardware timers may be employed.

In accordance with the embodiments of the invention described above, in an instance where a calling party receives a response from a party different from the intended party after the incoming call from a public telephone line is terminated and answered, as is often the case where a hold-and-transfer operation is used most frequently, the time needed for cutting of the wireless link after the response to an incoming call is made is lengthened. As a result, the operation for effecting transfer to another telephone or for holding and answering at another telephone can be facilitated and the waiting time of the calling party is shortened.

In a case where various devices, such as a facsimile device, which communicate data other than voice data are included in the system, the cutting of the wireless link can be performed in dependence upon the function of the device.

Further, by providing a switch for setting time up to the cutting of the wireless link, the operator is capable of setting the time in dependence upon the application or conditions of use. Accordingly, in a wireless communication system which accommodates devices having a plurality of functions, the time up to the cutting of the wireless link of each device can be changed in conformity with the function of the device and the state of use of the system.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication system that includes a plurality of communication apparatuses, including first and second communication apparatuses, and a control apparatus linked with the plurality of communication apparatuses, said system comprising:
   a link establishing unit adapted to establish links between the control apparatus and the first and second communication apparatuses, respectively, in accordance with detection of an incoming call;
   a discrimination unit adapted to discriminate a response to the incoming call of the first communication apparatus after the links between the control apparatus and the first and second communication apparatuses have been established by said link establishing unit;
   a link maintaining unit adapted to maintain the link between the control apparatus and the second communication apparatus even if said first communication apparatus responds to the incoming call;
   a detection unit adapted to detect that a predetermined time has passed after said discrimination unit discriminates the response of the first communication apparatus; and
   a cut unit adapted to cut the link between the control apparatus and the second communication apparatus maintained by said link maintaining unit in accordance with detection by said detection unit.

2. The system according to claim 1, wherein
   said control apparatus comprises a recognition unit adapted to recognize a wireless communication apparatus that performs voice communication and a communication apparatus that performs communication of data; and
   said link maintaining unit maintains the link in dependence upon a recognition made by said recognition unit.

3. The system according to claim 1, further comprising a setting unit adapted to set the predetermined time arbitrarily.

4. A wireless control apparatus linked with a plurality of communication apparatuses, including first and second communication apparatuses, comprising:
   a link establishing unit adapted to establish links with the first and second communication apparatuses, respectively, in accordance with detection of an incoming call;
   a discrimination unit adapted to discriminate a response to the incoming call of the first communication apparatus after the links between the control apparatus and the first and second communication apparatuses have been established by said link establishing unit;
   a link maintaining unit adapted to maintain the link established for communication with the second communication apparatus even if the first communication apparatus responds to the incoming call;
   a detection unit adapted to detect that a predetermined time has passed after said discrimination unit discriminates the response of the first communication apparatus; and
   a cut unit adapted to cut the link between the control apparatus and the second communication apparatus maintained by said link maintaining unit in accordance with detection by said detection unit.

5. The apparatus according to claim 4, wherein
   the control apparatus comprises a recognition unit adapted to recognize a communication apparatus that performs voice communication and a communication apparatus that performs communication of data; and
   said link maintaining unit maintains the link in dependence upon a recognition made by said recognition unit.

6. The apparatus according to claim 4, further comprising a setting unit adapted to set the predetermined time arbitrarily.

7. A method of controlling a communication system that includes a plurality of communication apparatuses, including first and second communication apparatuses, and a control apparatus linked with the plurality of communication apparatuses, said method comprising:
- a link establishment step of establishing links between the control apparatus and the first and second communication apparatuses, respectively, in accordance with detection of an incoming call;
- a discrimination step of discriminating a response to the incoming call of the first communication apparatus after the links between the control apparatus and the first and second communication apparatuses have been established in said link establishing step;
- a link maintaining step of maintaining the link between the control apparatus and the second communication apparatus even if the first wireless communication apparatus responds to an incoming call;
- a detection step of detecting that a predetermined time has passed after said discrimination unit discriminates the response of the first communication apparatus; and
- a cut step of cutting the link between the control apparatus and the second communication apparatus maintained by said link maintaining unit in accordance with detection in said detection step.

8. A method of controlling a control apparatus linked with a plurality of communication apparatuses including first and second communication apparatuses, said method comprising:
- a link establishing step of establishing links with the first and second communication apparatuses, respectively, in accordance with detection of an incoming call;
- a discrimination step of discriminating a response to the incoming call of the first communication apparatus after the links between the control apparatus and the first and second communication apparatuses have been established in said link establishing step;
- a link maintaining step of maintaining the link established for communication with the second communication apparatus even if the first communication apparatus responds to an incoming call;
- a detection step of detecting that a predetermined time has passed after said discrimination unit discriminates the response of the first communication apparatus; and
- a cut step of cutting the link between the control apparatus and the second communication apparatus maintained by said link maintaining unit in accordance with detection in said detection step.

9. A communication apparatus capable of communicating with first and second apparatuses comprising:
- a connection unit adapted to connect communication channels with the first and second apparatuses, respectively, in accordance with a communication request that is communicated from a third apparatus;
- a channel maintaining unit adapted to maintain a communication channel connected by said connection unit with the second apparatus even if the first apparatus starts communication with the third apparatus;
- a detection unit adapted to detect that a predetermined time has passed after communication between the first apparatus and the third apparatus is started; and
- a disconnection unit adapted to disconnect the communication channel maintained by said channel maintaining unit in accordance with detection by said detection unit.

10. The apparatus according to claim 9, further comprising a discrimination unit adapted to discriminate whether an apparatus performs voice communication or data communication, wherein said channel maintaining unit maintains the communication channel in accordance with a discrimination made by said discrimination unit.

11. A method of controlling a communication apparatus capable of communicating with first and second apparatuses, said method comprising:
- a connection step of connecting communication channels with the first and second apparatuses, respectively, in accordance with a communication request from a third apparatus;
- a channel maintaining step of maintaining a communication channel used for communication with the second apparatus even if the first apparatus starts communication with the third apparatus;
- a detection step of detecting that a predetermined time has passed after communication between the first apparatus and the third apparatus is started; and
- a disconnection step of disconnecting the communication channel maintained by said channel maintaining unit in accordance with detection in said detection step.

12. A computer-readable storage medium storing a program for implementing a method of controlling a control apparatus linked with a plurality of communication apparatuses including first and second communication apparatuses, the program comprising:
- code for a link establishment step of establishing links with the first and second communication apparatuses, respectively, in accordance with detection of an incoming call;
- code for a discrimination step of discriminating a response to the incoming call of the first communication apparatus after the links between the control apparatus and the first and second communication apparatuses have been established in said link establishing step;
- code for a link maintaining step of maintaining the link established for communication with the second communication apparatus even if the first communication apparatus responds to an incoming call;
- code for a detection step of detecting that a predetermined time has passed after said discrimination unit discriminates the response of the first communication apparatus; and
- code for a cut step of cutting the link between the control apparatus and the second communication apparatus maintained by said link maintaining unit in accordance with detection in said detection step.

13. A computer-readable storage medium storing a program for implementing a method of controlling a communication apparatus capable of communicating with first and second apparatuses, the program comprising:
- code for a connection step of connecting communication channels with the first and second apparatuses, respectively, in accordance with a communication request from a third apparatus;
- code for a channel maintaining step of maintaining a communication channel connected with the second apparatus even if the first apparatus starts communication with the third apparatus;

code for a detection step of detecting that a predetermined time has passed after communication between the first apparatus and the third apparatus is started; and code for a disconnection step of disconnecting the communication channel maintained by said channel maintaining unit in accordance with detection in said detection step.

* * * * *

UNITED STATES PATENT AND TRADEMARK OFFICE
CERTIFICATE OF CORRECTION

| | | |
|---|---|---|
| PATENT NO. | : 7,139,585 B2 | Page 1 of 1 |
| APPLICATION NO. | : 09/843806 | |
| DATED | : November 21, 2006 | |
| INVENTOR(S) | : Futoshi Hachimura et al. | |

It is certified that error appears in the above-identified patent and that said Letters Patent is hereby corrected as shown below:

ON THE TITLE PAGE ITEM [56] REFERENCES CITED:

Foreign Patent Documents, "63261947" should read --63-261947--.

COLUMN 1:

Line 32, "hot" should read --not--.

Signed and Sealed this

Twenty-second Day of May, 2007

JON W. DUDAS
*Director of the United States Patent and Trademark Office*